United States Patent
Rakuljic

(10) Patent No.: US 12,270,941 B2
(45) Date of Patent: Apr. 8, 2025

(54) LIGHT DETECTION AND RANGING SYSTEMS AND OPTICAL SYSTEM

(71) Applicant: Intel Corporation, Santa Clara, CA (US)

(72) Inventor: George Rakuljic, Santa Monica, CA (US)

(73) Assignee: Intel Corporation, Santa Clara, CA (US)

( * ) Notice: Subject to any disclaimer, the term of this patent is extended or adjusted under 35 U.S.C. 154(b) by 1049 days.

(21) Appl. No.: 17/031,985

(22) Filed: Sep. 25, 2020

(65) Prior Publication Data
US 2021/0018598 A1 Jan. 21, 2021

(51) Int. Cl.
| | |
|---|---|
| G01S 7/481 | (2006.01) |
| G01S 7/4911 | (2020.01) |
| G01S 7/4913 | (2020.01) |
| G01S 17/93 | (2020.01) |

(52) U.S. Cl.
CPC ........... *G01S 7/4811* (2013.01); *G01S 7/4911* (2013.01); *G01S 7/4913* (2013.01); *G01S 17/93* (2013.01)

(58) Field of Classification Search
None
See application file for complete search history.

(56) References Cited

U.S. PATENT DOCUMENTS

| | | | | |
|---|---|---|---|---|
| 2004/0208602 | A1* | 10/2004 | Plante | H04B 10/1125 |
| | | | | 977/932 |
| 2013/0069929 | A1* | 3/2013 | English | G09G 3/3466 |
| | | | | 345/212 |
| 2014/0376001 | A1* | 12/2014 | Swanson | G01S 7/4817 |
| | | | | 356/479 |
| 2017/0199279 | A1* | 7/2017 | Sebastian | G01S 17/87 |
| 2018/0052378 | A1 | 2/2018 | Shin et al. | |
| 2018/0306925 | A1 | 10/2018 | Hosseini et al. | |
| 2019/0004151 | A1 | 1/2019 | Abediasl et al. | |
| 2019/0025426 | A1 | 1/2019 | Satyan et al. | |
| 2019/0086518 | A1* | 3/2019 | Hallstig | G01S 7/4812 |
| 2019/0101647 | A1 | 4/2019 | Feshali et al. | |
| 2020/0217961 | A1* | 7/2020 | Russo | G01S 7/4918 |
| 2020/0309910 | A1* | 10/2020 | McCord | G01S 7/4816 |

(Continued)

FOREIGN PATENT DOCUMENTS

WO 2019014596 A1 1/2019

OTHER PUBLICATIONS

Suni et.al.; "Photonic Integrated Circuit FMCW Lidar on a Chip"; 19th Coherent Laser Radar Conference, Mo8; Jun. 18-21, 2018; 4 pages.

(Continued)

*Primary Examiner* — Isam A Alsomiri
*Assistant Examiner* — Sanjida Naser
(74) *Attorney, Agent, or Firm* — Viering, Jentschura & Partner mbB

(57) ABSTRACT

A light detection and ranging system is provided using a first electromagnetic radiation of a first emitting structure as local oscillator signal for a second electromagnetic radiation received from the outside of the light detection and ranging system, wherein the first and second electromagnetic radiations are coherent and the resulting signal is detected by a detecting structure. The resulting signal corresponds to an information of a target at the outside of the light detection and ranging system.

20 Claims, 9 Drawing Sheets

(56) References Cited

U.S. PATENT DOCUMENTS

2020/0363509 A1\* 11/2020 Sato .................. G01S 17/10
2021/0096250 A1\* 4/2021 Ogura ................ A61C 9/0053

OTHER PUBLICATIONS

International Search Report issued for the PCT Patent Application No. PCT/US2020/052601, dated Jan. 19, 2021, 13 pages (for informational purposes only).

\* cited by examiner

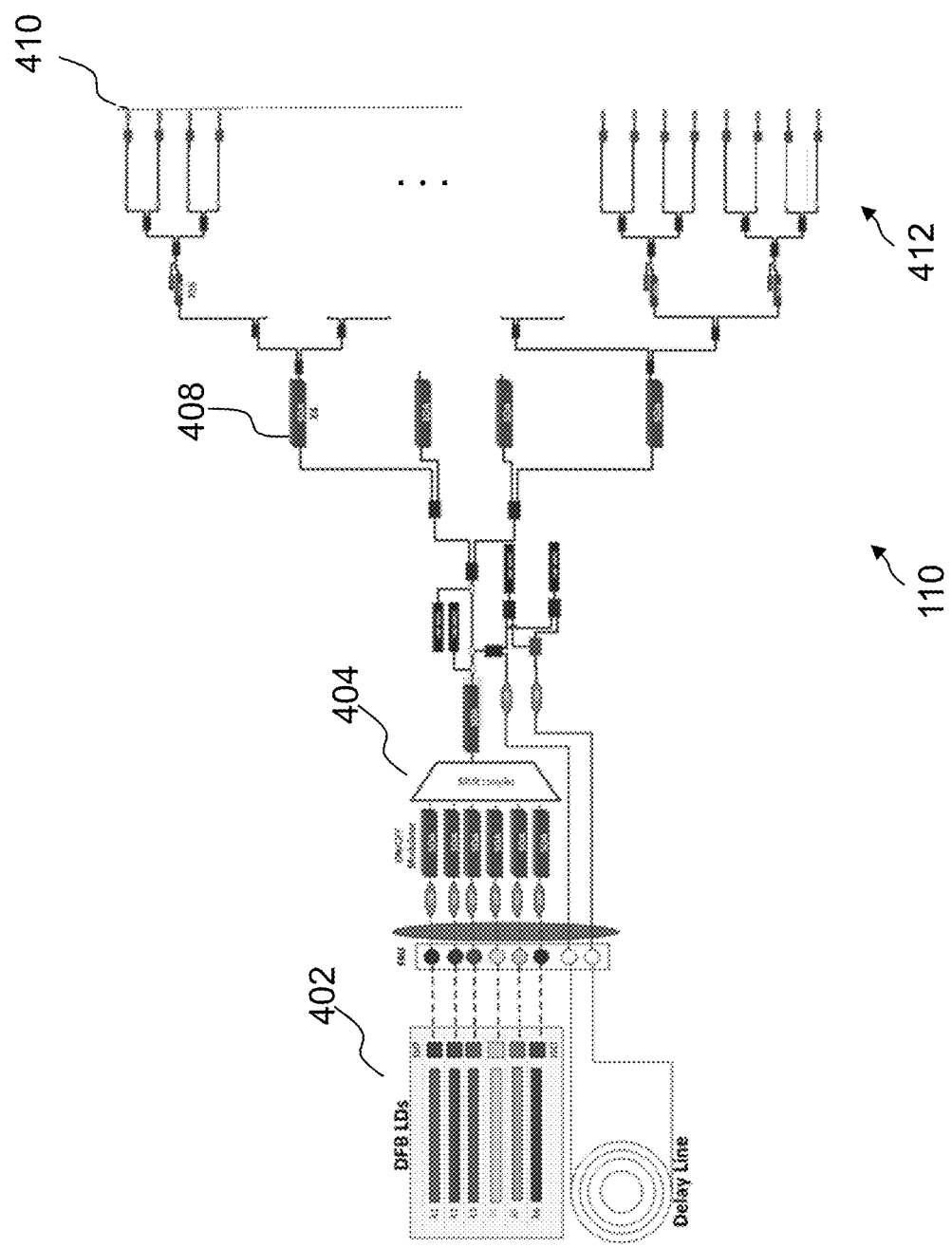

LIGHT DETECTION AND RANGING SYSTEMS AND OPTICAL SYSTEM

TECHNICAL FIELD

Various aspects of this disclosure generally relate to the field of light detection and ranging systems.

BACKGROUND

Coherent of light detection and ranging (LIDAR) is desirable for autonomous vehicles due to its inherent immunity to optical interference and ability to detect both the range and range-rate (relative velocity of a target) to a target. Notwithstanding these attributes, a coherent LIDAR system must still provide a long range detection capability (>200 m) and a high data rate (>1M pixels/s) with high optical resolution (>100 vertical pixels) to be commercially viable. Unfortunately, the performance of a coherent LIDAR, is negatively affected by time-of-flight (TOF) limitations on the detection process and fluctuating (Swerling II) target effects due to speckle.

The TOF limitation restricts the data rate of a coherent LIDAR system imposed by the finite speed of light and the need for multiple chirps to resolve Doppler ambiguity. For example, for a maximum range of 300 m, the data rate of a single optical channel (laser beam) is limited to 0.25 M pixels/s. Due to speckle, targets appear to fluctuate in a coherent LIDAR system, and the signal-to-noise-ratio (SNR) required for high probability detection can be more than 10 dB greater than for non-fluctuating targets. Without mitigation, a 10 dB SNR penalty would reduce the range of detection of a coherent LIDAR by a factor of 3 compared to an incoherent system.

The key to speckle mitigation, and to regaining the range performance in a coherent LIDAR, is to obtain multiple measurements over each scene pixel during each scan of the field of view, and then incoherently integrate them to mitigate the target fluctuations. The drawback is a further reduction in data rate by a factor of 2 or more, depending on the number of measurements to be integrated.

A Photonic Integrated Circuit (PIC) is desirable for coherent LIDAR due to the promise of low cost and scalability to high volume. However, due to PIC limitations (size, yield, cost), the number of vertical channels (resolution elements) is limited (~10's) and does not easily scale.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects of the invention are described with reference to the following drawings, in which:

FIG. 4 illustrates a photonic integrated circuit of an optical system according to various aspects;

DESCRIPTION

The following detailed description refers to the accompanying drawings that show, by way of illustration, specific details and aspects in which the invention may be practiced.

The word "exemplary" is used herein to mean "serving as an example, instance, or illustration". Any aspect or design described herein as "exemplary" is not necessarily to be construed as preferred or advantageous over other aspects or designs.

Figure 1:
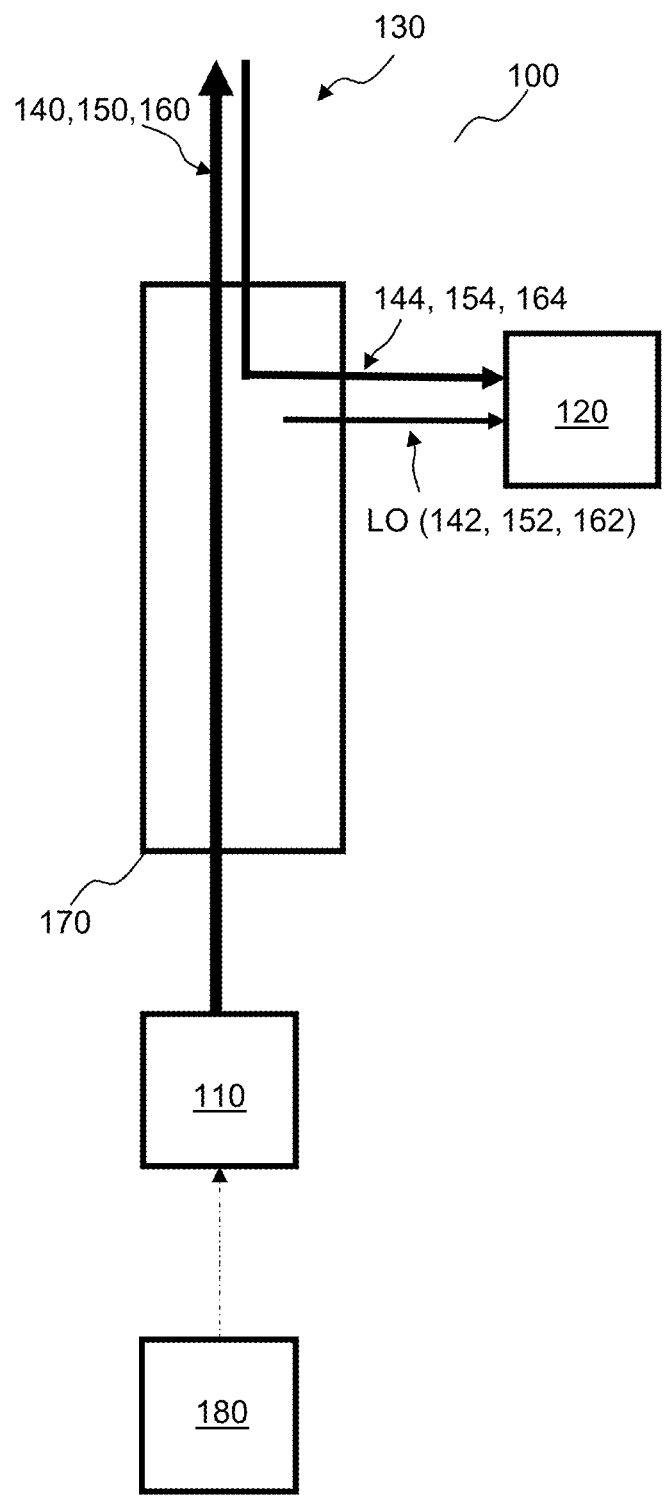
FIG. 1 illustrates a schematic diagram of an optical system according to various aspects.

FIG. 1 illustrates a schematic diagram of an optical system 100 according to various aspects. The optical system 100 may be or may be part of a light detection and ranging (LIDAR) system. Alternatively, the optical system 100 may be or may be part of a spectrometer or microscope.

In various aspects, the optical system 100 includes an emitting structure 110, a controller 180 configured to control the emission of electromagnetic radiation from the emitting structure 110, a plurality or an arrangement of optical components 170 and a detecting structure.

The optical components 170 may be configured to guide electromagnetic radiation 140, 150, 160 from the emitting structure 110 to the outside 130 of the optical system 100.

The optical components 170 may be configured to provide electromagnetic radiation 144, 154, 164 from the outside 130 of the optical system 100 to the detecting structure 120. The electromagnetic radiation 144, 154, 164 from the outside 130 of the optical system is related to the electromagnetic radiation 140, 150, 160 emitted to the outside 130. As example, the electromagnetic radiation 144, 154, 164 from the outside 130 may be electromagnetic radiation 140, 150, 160 that is back reflected from a target (e.g. target 210 in FIG. 2 and FIGS. 3A-3D).

The optical components 170 may be further configured to provide a local oscillator (LO) signal LO (142, 152, 162—illustrated in FIGS. 3A-3D) to the detecting structure 120. The LO signal is configured to be coherent at the detecting structure 120 with the electromagnetic radiation 144, 154, 164 from the outside 130. Thus, the LO signal 142, 152, 162 and the electromagnetic radiation 144, 154, 164 from the outside 130 may interfere (also denoted as superimpose) with each other and generate a resulting signal detected by the detecting structure 120. The resulting signal may correspond to an information to be detected at the outside 130 of the optical system, e.g. a distance towards a target 210 in a LIDAR system.

The plurality or arrangement of optical components 170 to generate the LO signal according to various aspects is described in more detail below (see FIGS. 3A-3D).

In various aspects, the emitting structure 110 and the detecting structure 120 may be embodied in separate components. In various aspects, the emitting structure 110 may be a photonic integrated circuit (PIC). The emitting structure 110 and the detecting structure 120 may be merged to a single component, e.g. a hybrid photonic integrated circuit system. This way, optical losses may remain at relatively low level. Hence, the optical system 100 embodied in a coherent LIDAR system, the performance may be at high level and power consumption may be at low level. Separate (hybrid) Tx and Rx circuits may be enabled by simultaneously generating the requisite local oscillator (LO) signals, e.g. by symmetrically arranging spatially parallel optical channels about the optical axis of the plurality of optical components, as illustrated in FIG. 3B. FIG. 3C illustrates an alternative hybrid PIC aspect incorporating balanced detecting structures 332, 334 of electromagnetic radiation. The balanced detection may be used to reduce an impact of electronic noise on the detected signal. These hybrid PIC aspects reduce the PIC complexity, optical losses and power consumption, thus enabling a lower cost coherent LIDAR with high optical resolution, high data rate, and long-range detection capabilities to be achieved. FIG. 3D illustrates an alternative hybrid PIC aspect that does not necessarily require a channel symmetry or crossover. This is accomplished by a converging lens 340 between the LO mirror 320 and a QWP 322, and a LO mirror 320 at the focal plane of the lens 340.

In various aspects, the light detection and ranging system 100 may include at least one electromagnetic radiation emitting structure 110 formed by a photonic integrated circuit configured to emit a coherent first electromagnetic radiation 140, 150, 160; at least one electromagnetic radiation detecting structure 120 configured to receive the coherent first electromagnetic radiation 144, 154, 164 and a second electromagnetic radiation LO (142, 152, 162) that is coherent to the coherent first electromagnetic radiation 144, 154, 164, wherein the electromagnetic radiation detecting structure 120 is external to the photonic integrated circuit; a plurality of optical components 170 optically configured to guide the coherent first electromagnetic radiation 140, 150, 160 from the electromagnetic radiation emitting structure 110 to an outside 130 of the light detection and ranging system 100 and first electromagnetic radiation 144, 154, 164 from the outside 130 of the light detection and ranging system 100 to the electromagnetic radiation detecting structure 120, wherein the optical components 170 are further configured to provide the coherent second electromagnetic radiation 142, 152, 162.

In various aspects, the optical components 170 are optically configured to generate the coherent second electromagnetic radiation from the coherent first electromagnetic radiation the before the coherent first electromagnetic radiation is emitted to the outside 130 (see also FIG. 3D). Alternatively, the photonic integrated circuit may include a second electromagnetic radiation emitting structure configured to emit the coherent second electromagnetic radiation (see also FIG. 3A to FIG. 3C).

In various aspects, the plurality or arrangement of optical components 170 may include a movable mirror 316 and a grating structure 314 configured to direct the coherent first electromagnetic radiation 140, 150 160 to the outside 130 and to direct reflected first electromagnetic radiation 144, 154, 164 from the outside 130 to the electromagnetic radiation detecting structure 120. The plurality of optical components 170 may further include a converging lens 304 configured to collimate and align, e.g. focus, the coherent first electromagnetic radiation 140, 150, 160 onto the grating structure 314. The plurality of optical components 170 may also include a half wave plate 318 optically configured to generate the coherent second electromagnetic radiation (see also FIG. 3C and FIG. 3D).

The photonic integrated circuit may include in various aspects a two-dimensional array of electromagnetic radiation emitting structures 110 wherein the plurality of electromagnetic radiation emitting structured 110 may include the coherent first electromagnetic radiation emitting structure 110.

In a coherent (or frequency-modulated continuous-wave (FMCW)) lidar system, range and speed to a target may be determined by the frequency difference between the return signal from the target and the LO signal that are coincident on the same detector. Thus, in various aspects, a controller 180 may be provided configured to control at least the coherent first electromagnetic radiation emitting structure 110 to adjust the emission timing of the emission of the coherent first electromagnetic radiation 140, 150, 160. The controller 180 may be further or alternatively configured to control at least the coherent first electromagnetic radiation detecting structure 120 to detect the first and second electromagnetic radiations. The controller 180 may be further configured to determine a difference between the frequency and/or phase of the first and second electromagnetic radiation received by the coherent first electromagnetic radiation detecting structure 120. The controller 180 may be further configured to determine a time difference between the emission timing of the coherent first electromagnetic radiation received by the electromagnetic radiation emitting structure 110 and the receiving timing of the coherent second electromagnetic radiation received by the electromagnetic radiation emitting structure 110 detecting structure 120. Alternatively or in addition, the controller 180 may be further configured to determine a frequency difference between the emission frequency of the coherent first electromagnetic radiation received by the electromagnetic radiation emitting structure 110 and the receiving frequency of the coherent second electromagnetic radiation received by the electromagnetic radiation emitting structure 110 detecting structure 120. In various aspects, a balanced detector arrangement having at least a first detector and a second detector may be provided, wherein each of the first and second detectors may include the electromagnetic radiation detecting structure 120 (see also FIG. 3C and FIG. 3D).

Figure 2:
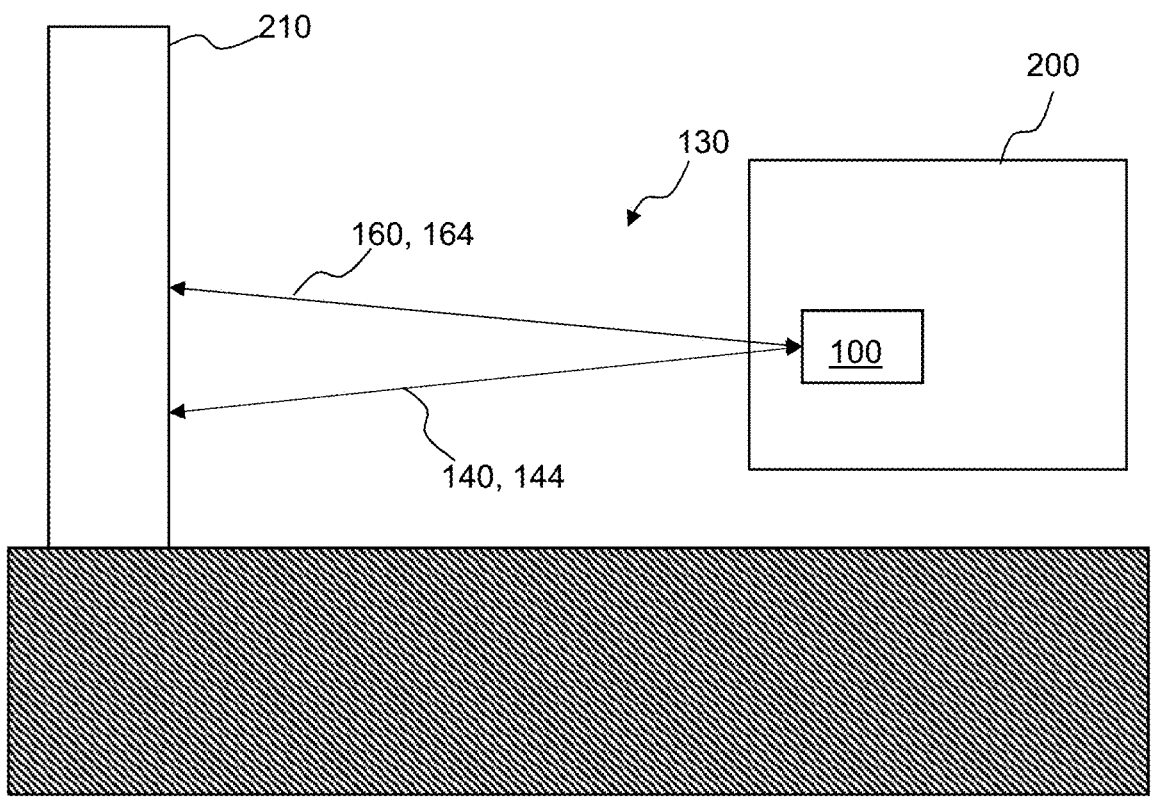
FIG. 2 illustrates a light detection and ranging system according to various aspects.

FIG. 2 illustrates a schematic diagram of a vehicle 200 having an optical system 100 integrated therein as a light detection and ranging (LIDAR) system 100 according to various aspects. The vehicle 200 may be an unmanned vehicle, e.g. unmanned aerial vehicle or unmanned automobile. The vehicle 200 may be an autonomous vehicle. Here, the LIDAR system 100 may be used to control the direction of travel of the vehicle. Alternatively or in addition, the vehicle may require a driver to control the direction of travel of the vehicle 200. Here, the LIDAR system 100 may be a driving assistant. As example, the LIDAR system 100 may be configured for obstacle detection, e.g. determining a distance and/or direction and relative velocity of an obstacle (target 210) outside of the vehicle 200.

Spatially parallel optical channels may provide the means for simultaneously generating requisite local oscillator (LO) signals (142, 152, 162 see FIGS. 3A-3D) for separate (hybrid) emitting structures (Tx) and detecting structures (Rx) to reduce optical losses and power consumption. Thus, a coherent LIDAR system with high optical resolution, high data rate, and long range detection may be achieved. The coherent LIDAR system may enable to increase the performance and to decrease the pricing for autonomous vehicle applications.

Figure 3A:
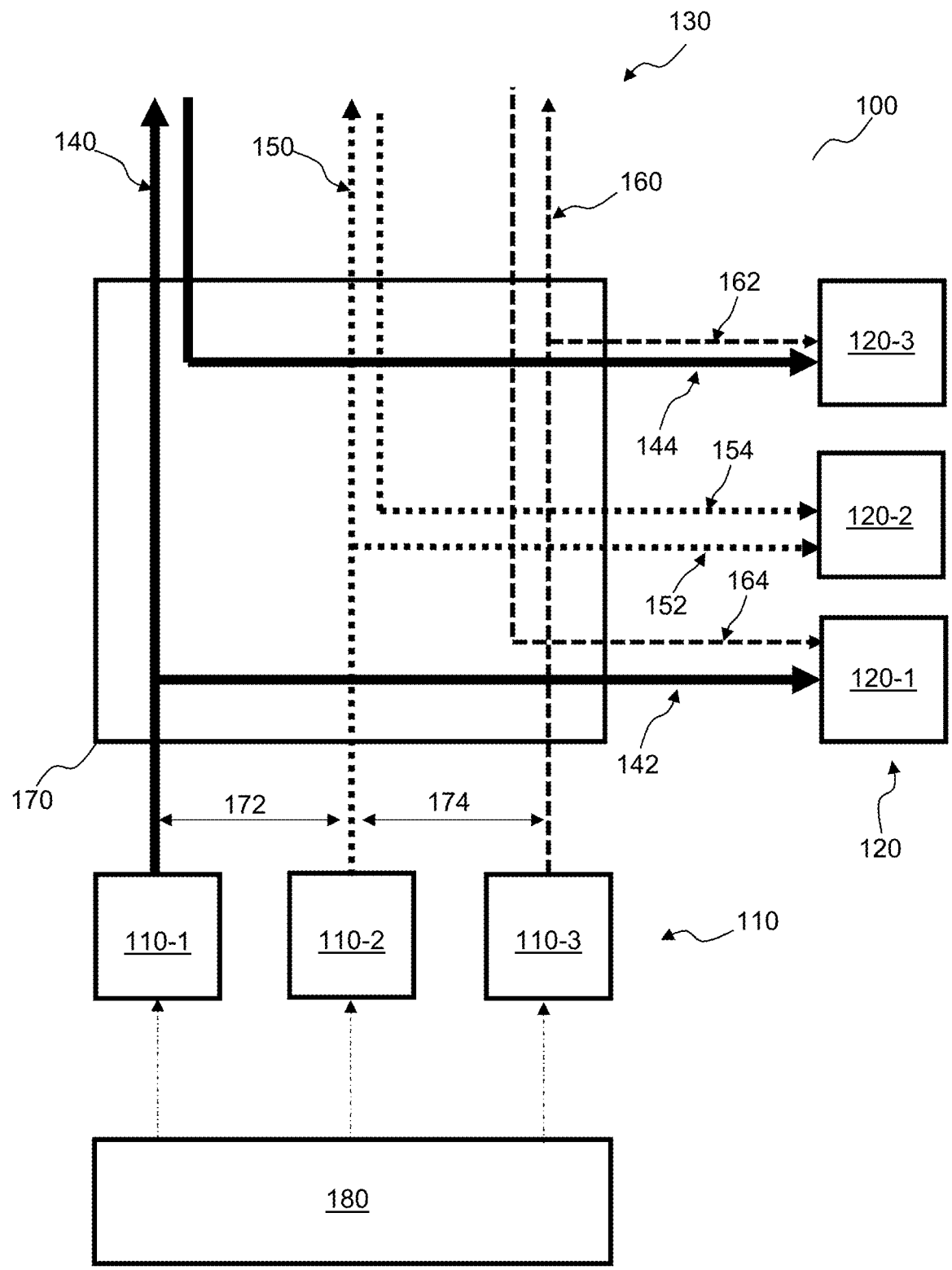
FIG. 3A to FIG. 3D illustrates a light detection and ranging system according to various aspects.
Figure 3B:
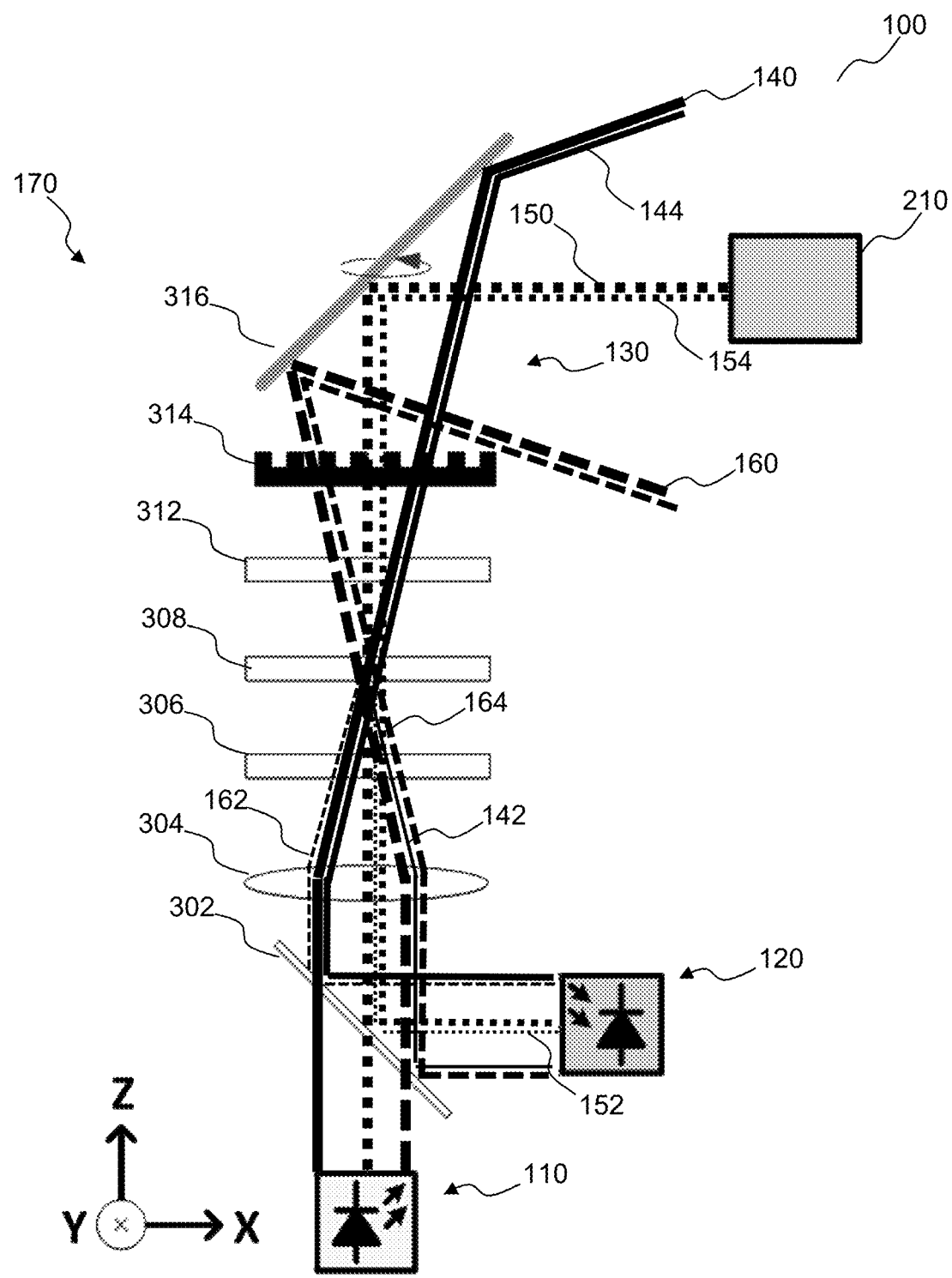
Figure 3C:
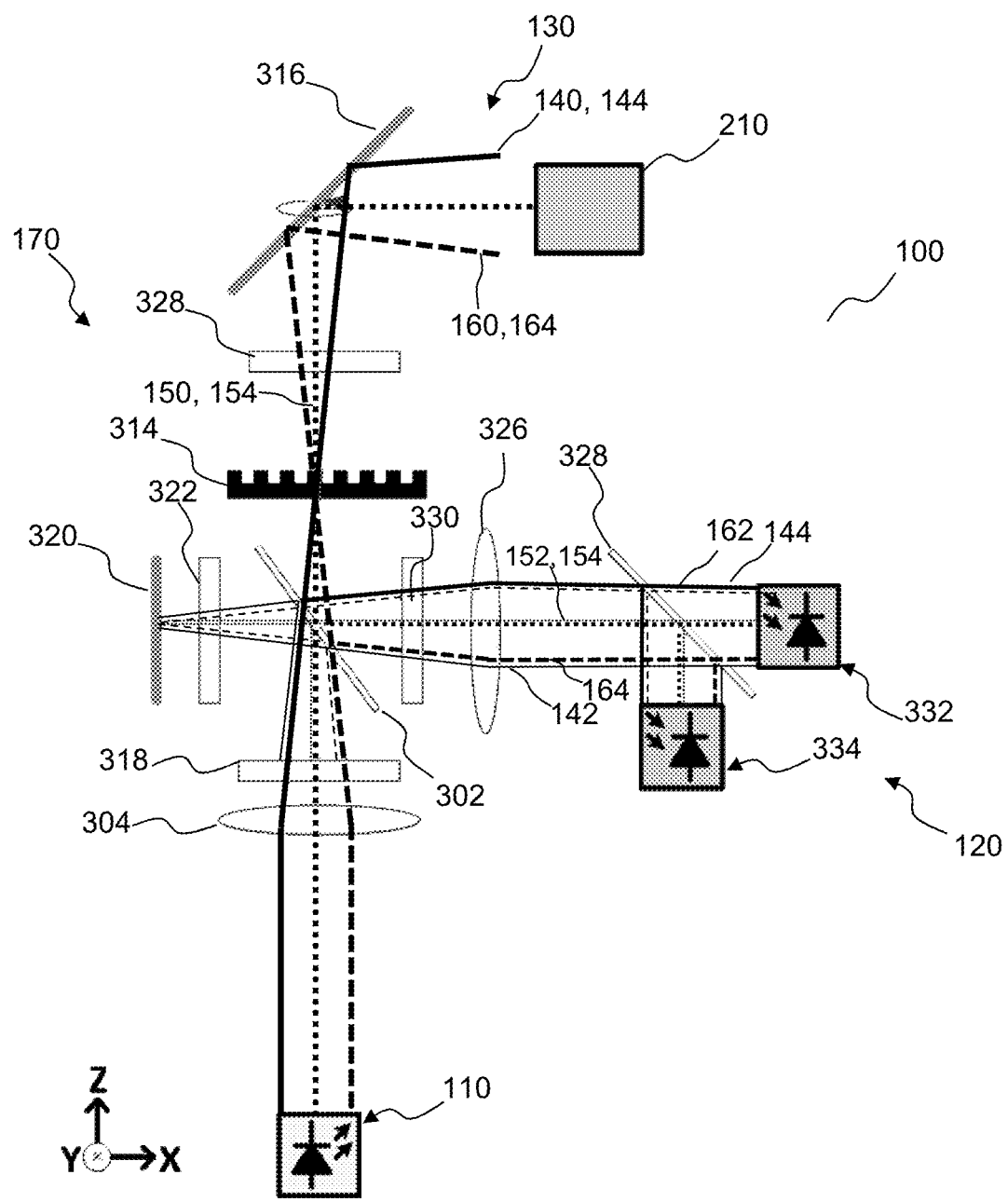
Figure 3D:
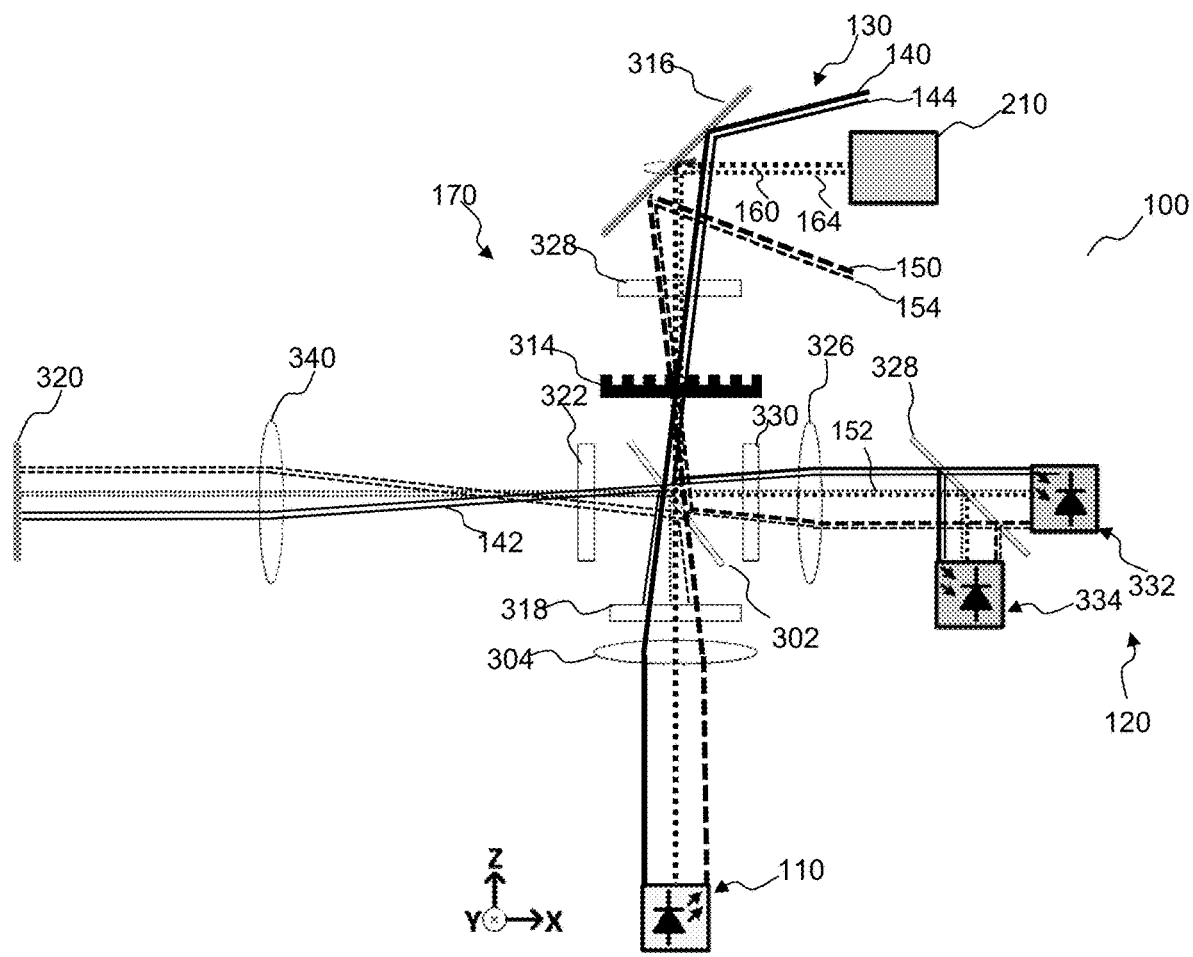

FIG. 3A illustrates a schematic diagram of an optical system 100 according to various aspects. The optical system 100 may be or may be part of a light detection and ranging (LIDAR) system. Alternatively, the optical system 100 may be or may be part of a spectrometer or microscope.

The optical system 100 may include a plurality of coherent electromagnetic radiation emitting structures 110 (also referred to as emitting structure 110) configured to emit coherent electromagnetic radiation 140, 150, 160 and one or more electromagnetic radiation detecting structures 120

(also referred to as detecting structure 120) configured to detect coherent electromagnetic radiation 142, 144, 152, 154, 162, 164.

The optical system 100 may further include a plurality or an arrangement of optical components 170 configured to guide electromagnetic radiation 140, 150, 160 emitted from the emitting structures 110 to the outside 130 of the optical system 100, configured to guide electromagnetic radiation 142, 152, 162 from the emitting structures 110 to the detecting structures 120 and configured to guide electromagnetic radiation 144, 154, 164 from the outside 130 to the one or more detecting structure(s) 120. The optical components 170 may include common optical components, e.g. one or beam splitter, one or more converging lens, one or more quarter and/or half wave plate, one or more mirror, one or more optical tap and/or one or more grating, etc. The optical system 100 may further include a controller 180 configured to control the frequency and timing of emission of electromagnetic radiation from the emitting structure(s) 110 (in FIG. 1 illustrated by the dash-dotted arrows).

In the aspect illustrated in FIG. 3A, the plurality of emitting structures 110 includes a first emitting structure 110-1, a second emitting structure 110-2 and third emitting structure 110-3. Further, the one or more detecting structure(s) 120 includes a first detecting structure 120-1, a second detecting structure 120-2 and third detecting structure 120-3. A detecting structure 120, 120-1, 120-2, 120-3, 332, 334 may include one or more individual photo detectors. The photo detectors of different optical paths may be optically isolated from each other and/or may be addressable independently from each other. In other words, the photo detectors 120 of different optical paths may be configured to detect light from the outside 130 of the optical systems 100 independently from each other.

In various aspects, there may be provided a first electromagnetic radiation emitting structure 110-1 configured to emit a coherent first electromagnetic radiation 140 and a second electromagnetic radiation emitting structure 110-2 configured to emit a coherent second electromagnetic radiation 160. Further, there may be a first electromagnetic radiation detecting structure 120-1 configured to detect the first and second coherent electromagnetic radiation 142, 164 and a second electromagnetic radiation detecting structure 120-3 configured to detect the first and second coherent electromagnetic radiation 144, 162.

In various aspects, the optical components 170, the emitting structures 110 and the detecting structures 120 may be arranged such that there is a center path (e.g. optical path 150 illustrated in FIGS. 3A-3D) that corresponds to an optical axis along which there is at least some degree of rotational symmetry. Further emitting structures 110-1, 110-3 may be arranged in a distance 172, 174 to the center path. Along the center path, electromagnetic radiation 152 from the emitting structure 110-2 may be correlated with the electromagnetic radiation 154 from the outside 130 at the detecting structure 120. Thus, the electromagnetic radiation 150 emitted along the center path may be autocorrelated (also denoted as self-referenced) at the detecting structure 120-2. The first and second electromagnetic radiations may be coherent to each other at the first and second electromagnetic radiation detecting structure. Thus, electromagnetic radiation 142, 162 emitted by the emitting structures 110-1, 110-3 distanced apart from the center path by space 172, 174 may be correlated mutually.

In various aspects, the controller 180 may be configured to control various electronic components. The controller 180 may be an application specific integrated circuit (ASIC), as example. The controller 180 may be formed from, integrated in or mounted to the semiconductor photonic substrate. However, the controller 180 may also be located outside of the PIC in various aspects.

The controller 180 may further be configured to determine a frequency difference between the frequency of the emitted electromagnetic radiation 142, 152, 162 and the received electromagnetic radiation 144, 154, 164 and to determine a frequency difference between the frequency and/or phase of the emitted and received electromagnetic radiation of each optical channel (emitting structure).

The controller 180 may further be configured to determine a time difference between the emission timing of the emitted electromagnetic radiation 142, 152, 162 and the detection timing of the received electromagnetic radiation 144, 154, 164. Alternatively or in addition, the controller 180 may further be configured to determine a frequency difference between the emission frequency of the emitted electromagnetic radiation 142, 152, 162 and the detection frequency of the received electromagnetic radiation 144, 154, 164.

The controller 180 may further be configured to control the emitting structures such that a first electromagnetic radiation and a second electromagnetic radiation are emitted from each of the emitting structures at the same time. The coherent first electromagnetic radiation and the coherent second electromagnetic radiation may have the same frequency. Alternatively, the coherent first electromagnetic radiation may have a first frequency and the coherent second electromagnetic radiation may have a second frequency different from the first frequency.

In other words, the optical system 100 may include a plurality or an arrangement of optical components 170 optically configured to guide electromagnetic radiation from the at least first and second electromagnetic radiation emitting structures 110-1, 110, 2 to an outside 130 of the optical system 100 and from the outside 130 of the optical system 100 to the least first and second electromagnetic radiation detecting structures 120-2, 120-2. The plurality of optical components 170 may be configured to branch the electromagnetic radiation to guide first electromagnetic radiation 142 from the coherent first electromagnetic radiation emitting structure 110-1 to the coherent first electromagnetic radiation detecting structure 120-1 and first electromagnetic radiation 144 from the outside 130 of the optical system 100 to the coherent second electromagnetic radiation detecting structure 120-3 and to guide second electromagnetic radiation 162 from the coherent second electromagnetic radiation emitting structure 110-3 to the coherent second electromagnetic radiation detecting structure 120-3 and second electromagnetic radiation 164 from the outside 130 of the optical system 100 to the coherent first electromagnetic radiation detecting structure 120-1.

The first and second electromagnetic radiation at the first and second detecting structures 120-1, 120-3 may have the same frequency and may be modulated, e.g. regarding the timing of emission, such that, as example, the coherent second electromagnetic radiation used as reference for the coherent first electromagnetic radiation at the second detecting structure 120-3 as if first electromagnetic radiation 142 would be detected by the second detecting structure 120-3. First and second electromagnetic radiations are correlated, e.g. by interference, at the detecting structures. Hence, the detecting structures may detect the result of interference of both signals and output an according signal. The output signal may contain a desired information, e.g. corresponding to a target distance in a LIDAR application as described below.

As example, the spacing 172, 174 may be equal such that the first and second emitting structures 110-1, 110-3 are arranged symmetrical regarding the center path and the emission timing (e.g. the phase relation of the first and second electromagnetic radiations) is adjusted accordingly.

Thus, detrimental effects due to fluctuating targets and time of flights limitations may be mitigated by using multiplexing (by means of a grating as an optical component) of the first and second electromagnetic radiation of spatially parallel optical channels.

In various aspects, the emitting structures 110 may be arranged in an array, e.g. along a line as a 1-dimensional array, e.g. a linear array of edge emitters, or in a grid structure as a 2-dimensional array. The emitting structures of the array may be arranging symmetrical regarding the optical axis or center path respectively. As example, emitting structures may be arranged pairwise having the same distance 170, 172 regarding the center path. In other words, the emitting structures may be arranging point-symmetric regarding the center path. However, the distance between directly adjacent emitting structures (of different emitting structure pairs) may different. As example, the next-neighbor distance of emitting structures may increase with increasing distance from the center path. This way, the resolution of the optical system may be spatially adjusted, e.g. may be higher in the proximity of the center path of the optical system 100 than at the edge of the visual field of the optical system 100.

In various aspects, the optical system 100 may include at least a first electromagnetic radiation emitting structure 110-1 configured to emit a coherent first electromagnetic radiation and a second electromagnetic radiation emitting structure 110-3 configured to emit a coherent second electromagnetic radiation; at least a first electromagnetic radiation detecting structure 120-1 configured to detect the first and second coherent electromagnetic radiation and a second electromagnetic radiation detecting structure 120-3 configured to detect the first and second coherent electromagnetic radiation; a plurality of optical components 170 optically configured to guide electromagnetic radiation from the at least first and second electromagnetic radiation emitting structures to an outside 130 of the optical system 100 and from the outside 130 of the optical system 100 to the least first and second electromagnetic radiation detecting structures, wherein the plurality of optical components 170 may be configured to guide first electromagnetic radiation from the coherent first electromagnetic radiation emitting structure 110-1 to the coherent first electromagnetic radiation detecting structure 120-1 and first electromagnetic radiation from the outside 130 of the optical system 100 to the coherent second electromagnetic radiation detecting structure 120-3 and to guide second electromagnetic radiation from the coherent second electromagnetic radiation emitting structure 110-3 to the coherent second electromagnetic radiation detecting structure 120-3 and second electromagnetic radiation from the outside 130 of the optical system 100 to the coherent first electromagnetic radiation detecting structure 120-1, and wherein the plurality of optical components 170 may be configured that the first and second electromagnetic radiations may be coherent to each other at the first and second electromagnetic radiation detecting structure 120-3.

The plurality of optical components 170 may include an optical axis, wherein the coherent first electromagnetic radiation emitting structure 110-1 may be arranged in a first distance 170 from the optical axis and the coherent second electromagnetic radiation emitting structure 110-3 may be arranged in a second distance 172 from the optical axis, wherein the first distance 170 may be the same as the second distance 172.

The coherent first electromagnetic radiation emitting structure 110-1, the optical axis and the coherent second electromagnetic radiation emitting structure 110-3 may be arranged along or in one common line.

In various aspects, a third electromagnetic radiation emitting structure may be arranged in a third distance from the coherent first electromagnetic radiation emitting structure 110-1 and a fourth electromagnetic radiation emitting structure may be arranged in a fourth distance from the coherent second electromagnetic radiation emitting structure 110-3, wherein the third distance may be the same as the fourth distance and wherein the third distance may be different from the first distance 170.

In various aspects, a center electromagnetic radiation emitting structure 110-2 may be arranged at an optical axis of the plurality of optical components 170.

The at least a first electromagnetic radiation emitting structure 110-1 and the coherent second electromagnetic radiation emitting structure 110-3 may be formed by a photonic integrated circuit.

The plurality of optical components 170 may include a movable mirror (316—illustrated in FIGS. 3B-3D) configured to direct the first and second electromagnetic radiations 140, 160 to the outside 130 and to direct back reflected first and second electromagnetic radiation 144, 164 from the outside 130 to the first and second electromagnetic radiation detecting structures 120-1, 120-3. Here, "back reflected" electromagnetic radiation may be understood as electromagnet radiation 144, 154, 164 that is guided on the same optical path and at least partially through the same optical elements 170 from a target 210 to the detecting structures 120 as the electromagnetic radiation 140, 150, 160 emitted towards the target 210.

The plurality of optical components 170 may include a grating structure 314 configured to direct the first and second electromagnetic radiations 140, 160 to outside 130 and to direct back reflected first and second electromagnetic radiation 144, 164 from the outside 130 to the first and second electromagnetic radiation detecting structures 120-1, 120-3.

The plurality of optical components 170 may include a converging lens 304 configured to collimate and align, e.g. focus, the first and second electromagnetic radiation onto the grating structure 314.

The plurality of optical components 170 may include a phase shifting structure 306, 318, 328, 330 configured to shift a phase of the first and second electromagnetic radiation The plurality of optical components 170 may include an optical tap 308 configured to direct the coherent first electromagnetic radiation to the coherent second electromagnetic radiation detecting structure 120-3 and to direct second electromagnetic radiation to the coherent first electromagnetic radiation detecting structure 120-1, wherein the optical tap 308 may be configured as a substantially transparent plate.

The first and second electromagnetic radiation emitting structures may be part of a plurality of electromagnetic radiation emitting structures arranged in a two-dimensional array.

The plurality of optical components 170 may include a movable mirror 316 configured to direct the first and second electromagnetic radiations 140, 160 to outside 130 and to direct back reflected first and second electromagnetic radiation 144, 164 from the outside 130 to the first and second electromagnetic radiation detecting structures 120-1, 120-3.

In various aspects, there may be a controller 180 provided configured to control at least the first and second electromagnetic radiation emitting structures to adjust the emission timing of the emission of the first and second electromagnetic radiation. The controller 180 may be configured to control at least the first and second electromagnetic radiation detecting structures 120-1, 120-3 to detect the first and second electromagnetic radiation. The controller 180 may be further configured to determine a difference between the frequency and/or phase of the first and second electromagnetic radiation received by the coherent first electromagnetic radiation detecting structure 120-1; and to determine a difference between the frequency and/or phase of the first and second electromagnetic radiation received by the coherent second electromagnetic radiation detecting structure 120-3. The controller 180 may be further configured to determine a time difference between the emission timing of the coherent first electromagnetic radiation received by the coherent first electromagnetic radiation emitting structure 110-1 and the receiving timing of the coherent second electromagnetic radiation received by the coherent first electromagnetic radiation emitting structure 110-1 detecting structure; and to determine a time difference between the emission timing of the coherent second electromagnetic radiation received by the coherent second electromagnetic radiation emitting structure 110-3 and the receiving timing of the coherent first electromagnetic radiation received by the coherent second electromagnetic radiation emitting structure 110-3 detecting structure. The controller 180 may further be configured to emit the coherent first electromagnetic radiation and the coherent second electromagnetic radiation at the same time.

The coherent first electromagnetic radiation and the coherent second electromagnetic radiation may have the same frequency. Alternatively, the coherent first electromagnetic radiation may have a first frequency and the coherent second electromagnetic radiation may have a second frequency different from the first frequency. Alternatively or in addition, the first and second electromagnetic radiation emitting structures may be configured to emit electromagnetic radiation of at least at first frequency band and of a second frequency band not overlapping the first frequency band.

In various aspects, a balanced detector having at least a first balanced detector and a second balanced detector may be provided, wherein each of the first and second balanced detectors may include the first and second electromagnetic radiation detecting structures 120-1, 120-3.

In various aspects, a light detection and ranging system may include at least a first electromagnetic radiation emitting structure 110-1 configured to emit a coherent first electromagnetic radiation 140 and a second electromagnetic radiation emitting structure 110-3 configured to emit a coherent second electromagnetic radiation 160; at least a first electromagnetic radiation detecting structure 120-1 configured to detect the first and second coherent electromagnetic radiation and a second electromagnetic radiation detecting structure 120-3 configured to detect the first and second coherent electromagnetic radiation; a plurality of optical components 170 optically configured to guide electromagnetic radiation from the at least first and second electromagnetic radiation emitting structures to an outside 130 of the optical system 100 and from the outside 130 of the optical system 100 to the least first and second electromagnetic radiation detecting structures. The plurality of optical components 170 may be configured to guide first electromagnetic radiation from the coherent first electromagnetic radiation emitting structure 110-1 to the coherent first electromagnetic radiation detecting structure 120-1 and first electromagnetic radiation from the outside 130 of the optical system 100 to the coherent second electromagnetic radiation detecting structure 120-3 and to guide second electromagnetic radiation from the coherent second electromagnetic radiation emitting structure 110-3 to the coherent second electromagnetic radiation detecting structure 120-3 and second electromagnetic radiation from the outside 130 of the optical system 100 to the coherent first electromagnetic radiation detecting structure 120-1. The plurality of optical components 170 may be configured that the first and second electromagnetic radiations may be coherent to each other at the first and second electromagnetic radiation detecting structure 120-3. The plurality of optical components 170 may include an optical axis, wherein the coherent first electromagnetic radiation emitting structure 110-1 may be arranged in a first distance 170 from the optical axis and the coherent second electromagnetic radiation emitting structure 110-3 may be arranged in a second distance 172 from the optical axis. The first distance 170 may be the same as the second distance 172. The at least a first electromagnetic radiation emitting structure 110-1 and the coherent second electromagnetic radiation emitting structure 110-3 may be formed by a photonic integrated circuit.

The coherent first electromagnetic radiation emitting structure 110-1, the optical axis and the coherent second electromagnetic radiation emitting structure 110-3 may be arranged along or in one common line.

A third electromagnetic radiation emitting structure may be arranged in a third distance from the coherent first electromagnetic radiation emitting structure 110-1 and a fourth electromagnetic radiation emitting structure may be arranged in a fourth distance from the coherent second electromagnetic radiation emitting structure 110-3. The third distance may be the same as the fourth distance and the third distance may be different from the first distance 170.

In various aspects, there may be center electromagnetic radiation emitting structure 110-2 arranged at the optical axis of the plurality of optical components 170.

The plurality of optical components 170 may include a movable mirror 316 configured to direct the first and second electromagnetic radiations 140, 160 to outside 130 and to direct back reflected first and second electromagnetic radiation 144, 164 from the outside 130 to the first and second electromagnetic radiation detecting structures 120-1, 120-3.

The plurality of optical components 170 may include a grating structure 314 configured to direct the first and second electromagnetic radiations 140, 160 to outside 130 and to direct back reflected first and second electromagnetic radiation 144, 164 from the outside 130 to the first and second electromagnetic radiation detecting structures 120-1, 120-3.

The plurality of optical components 170 may further include a converging lens 304 configured to collimate and align, e.g. focus, the first and second electromagnetic radiation 140, 160 onto the grating structure 314. The plurality of optical components 170 may further include a phase shifting structure 306, 318, 328, 330 configured to shift a phase of the first and second electromagnetic radiation.

The plurality of optical components 170 may include an optical tap 308 configured to direct the coherent first electromagnetic radiation to the coherent second electromagnetic radiation detecting structure 120-3 and to direct second electromagnetic radiation to the coherent first electromagnetic radiation detecting structure 120-1, wherein the optical tap 308 may be configured as a substantially transparent plate.

The first and second electromagnetic radiation emitting structures may be part of a plurality of electromagnetic radiation emitting structures arranged in a two-dimensional array.

The plurality of optical components 170 may include a movable mirror 316 configured to direct the first and second electromagnetic radiations 140, 160 to outside 130 and to direct back reflected first and second electromagnetic radiation 144, 164 from the outside 130 to the first and second electromagnetic radiation detecting structures 120-1, 120-3.

In various aspects, there may be a controller 180 configured to control at least the first and second electromagnetic radiation emitting structures to adjust the emission timing and/or frequencies of the emission of the first and second electromagnetic radiation. The controller 180 may be configured to control at least the first and second electromagnetic radiation detecting structures 120-1, 120-3 to detect the first and second electromagnetic radiation. The controller 180 may be further configured to determine a difference between the frequency and/or phase of the first and second electromagnetic radiation received by the coherent first electromagnetic radiation detecting structure 120-1; and to determine a difference between the frequency and/or phase of the first and second electromagnetic radiation received by the coherent second electromagnetic radiation detecting structure 120-3. The controller 180 may be further configured to determine a time difference between the emission timing of the coherent first electromagnetic radiation received by the coherent first electromagnetic radiation emitting structure 110-1 and the receiving timing of the coherent second electromagnetic radiation received by the coherent first electromagnetic radiation emitting structure 110-1 detecting structure; and to determine a time difference between the emission timing of the coherent second electromagnetic radiation received by the coherent second electromagnetic radiation emitting structure 110-3 and the receiving timing of the coherent first electromagnetic radiation received by the coherent second electromagnetic radiation emitting structure 110-3 detecting structure.

The controller 180 may be further configured to so that the coherent first electromagnetic radiation and the coherent second electromagnetic radiation may be emitted at the same time. The coherent first electromagnetic radiation and the coherent second electromagnetic radiation may have the same frequency. Alternatively, the coherent first electromagnetic radiation may have a first frequency and the coherent second electromagnetic radiation may have a second frequency different from the first frequency. A balanced detector having at least a first balanced detector and a second balanced detector, wherein each of the first and second balanced detectors may include the first and second electromagnetic radiation detecting structures 120-1, 120-3. Alternatively or in addition, the first and second electromagnetic radiation emitting structures may be configured to emit electromagnetic radiation of at least at first frequency band and of a second frequency band not overlapping the first frequency band.

FIG. 3B to FIG. 3D illustrate a light detection and ranging system according to various aspects. In the illustrated aspects, the plurality of optical components 170 is illustrated in details and is described in the following. In FIG. 3A and FIG. 3B, the optical path of the emitted electromagnetic radiations 140, 150, 160, the electromagnetic radiation 142, 152, 162 used as local oscillator (also denoted as coherent reference) and the electromagnetic radiation 144, 154, 164 back reflected from the target 210 are illustrated using lines of different line thickness.

In various aspects, the plurality of optical components 170 may include one or more partially transparent or one-way mirror(s) 302, one or more movable scanning mirror(s) 316, 320, one or more (movable) converging lens(es) 304, 326, one or more phase shifting structures, e.g. one or more quarter wave plate(s) (QWP) 306, 322, 328, 330, one or more half wave plate (HWP) 318 (small angle for LO); one or more compensating wave plate(s) (CWP) 312 used to negate birefringence of a grating and/or scanning optic component; one or more optical grating structure 314 and/or one or more optical taps 308 (e.g. a transparent and partially reflective plate).

In the aspect illustrated in FIG. 3B, origin of the local oscillator (LO) signals (also denoted as reference signals) 142, 152, 162 may be a slight axial rotation of the electromagnetic radiation 140, 150 160 at the HWP 318. This may create a weak, orthogonally polarized component (the LO signals 142, 152, 162). The LO signals may be directed to the detecting structure 120, by the polarizing beam splitter (PBS) (302), the quarter wave plate (QWP) 322 and the LO mirror 320. Thus, in this aspect, none of the back reflected electromagnetic radiation 144, 154, 164 from the target 210 appears to the left side of PBS 302. The electromagnetic radiation 144, 154, 164 from the target 210 may be reflected by PBS 302 directly towards the detector structure 120 to mix with the LO signals 142, 152, 162 respectively.

Further, between the PBS 302 and the QWP 330, the electromagnetic radiation of each channel (in FIG. 3B the center channel and the channels left and right from the center channel) may include a signal portion (Sig(V)) and a LO portion (LO(H)). Between the QWP 330 and the PBS 328, the signal portion (Sig(V)) may be split due to the QWP 330 into a first signal portion (½ Sig(H)) and a second signal portion (½ Sig (V)) and the LO portion (LO(H)) may be split due to the QWP 330 into a first LO portion (½ LO(H)) and a second LO portion (½ LO (V)). The first signal portion (½ Sig(H)) and the first LO portion (½ LO(H)) may be guided to the first detecting structure 334 and the second signal portion (½ Sig(V)) and the second LO portion (½ LO(V)) may be guided to the second detecting structure 332 by the PBS 328, respectively. Thus, a balanced detector pair 328, 330 may be realized for the detecting structure 120.

Alternatively, as illustrated in the aspect illustrated in FIG. 3D, the crossover of LO signal 142, 152, 162 and electromagnetic radiation 144, 154, 164 from the outside 130 may be optional by a (converging) lens 340 between the LO mirror 320 and the PBS 302.

FIG. 4 illustrates a schematic diagram of a emitting structure 110 embodied as a PIC according to various aspects.

The emitting structure 110 may include a plurality of light sources 402 (also denoted as (coherent) electromagnetic radiation source) each configured to emit electromagnetic radiation having a wavelength/frequency different to the wavelength/frequency of the other light sources. Alternatively or in addition, the emitting structure 110 may include one or more light source(s) configured to emit electromagnetic radiation of different/multiple wavelengths/frequencies. A wavelength/frequency of a plurality of wavelengths/frequencies of a single light source may be selected by an optical filter, e.g. a low pass, high pass, band pass or notch filter.

Figure 5:
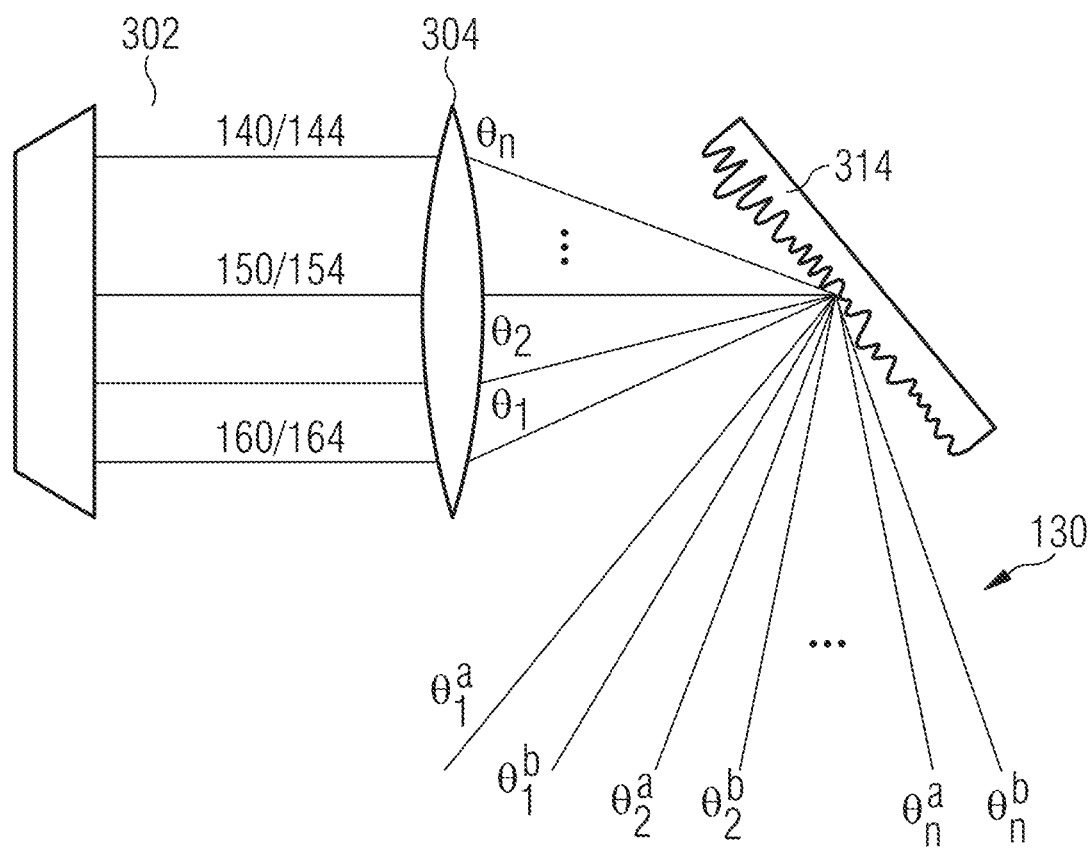
FIG. 5 illustrates a light detection and ranging system according to various aspects.

The optical components 170, e.g. the grating structure 314, may be configured to have a diffraction depending on the frequency of the electromagnet radiation (see also FIG. 5).

Further illustrated in FIG. 4 is the branching of light paths from the at least one input 404 to the plurality of outputs 410 generating the plurality of emitting structures 110-1, 110-2, 110-3. The branching may be realized by a plurality of optical amplifiers 408, e.g. SOA, a plurality of optical splitters and a plurality of waveguide structures (waveguide structures are illustrated as solid lines in FIG. 4).

In various aspects, the emitting structure 110 may be configured to emit electromagnetic radiation of various frequencies, e.g. sequentially or at the same time. As example, the emitting structure 110 may be embodied as one or more photonic integrated circuit (PIC). In various aspects, two or more PICs may be stacked to form a 2-dimensional array. Thus, the resolution of the optical system may be adjusted by adjusting the number of electromagnetic radiations of different frequencies par output channel. This may also be combined with the spacing of adjacent emitting structures as described above. As example, the resolution of the optical system may be spatially adjusted by using a larger number of electromagnetic radiations of different frequencies than in the proximity of the center path of the optical system 100 than at the edge of the visual field of the optical system 100.

The photonic integrated circuit may include a semiconductor photonic substrate having integrated therein at least one light receiving input and at least one optical splitter 404 to branch electromagnetic radiation from a source 402 to N electromagnetic radiation output structures 410 with N being a rational number. In other words, the photonic integrated circuit may include a plurality of optical paths. Thus, as example, multiple (>10) vertical optical channels operating in parallel may be provided. Hence, a high (>1M pixels/s) overall or effective data rate may be enabled. The number of PIC channels to increase the number of vertical resolution elements (or reduce the cost by using fewer or smaller PICs) is readily scalable. A coherent LIDAR implemented on a silicon PIC may (uniquely) enable the high performance and pricing required by customers for autonomous vehicle applications.

The semiconductor photonic substrate may be made of a semiconductor material, e.g. silicon. The semiconductor photonic substrate may be common substrate, e.g. at least for the plurality of optical paths 412. The term "integrated therein" may be understood as formed from the material of the substrate and, thus, may be different to the case in which elements are formed, arranged or positioned on top of a substrate.

Each optical path 412 may include a waveguide structure. A waveguide structure may be in the form of a strip line or micro strip line. However, a waveguide structure may also be a planar waveguide. The waveguide structure may be configured to guide an electromagnetic radiation emitted from a light source 402 coupled to the input 404 to the output 410. The waveguide structure may be formed from the material of the semiconductor photonic substrate.

The light receiving input 404 may include an optical coupler configured for optical interconnect an electromagnetic radiation source outside 402 of the semiconductor photonic substrate (e.g. an external electromagnetic radiation source) to the at least one optical splitter.

The light source(s) 402 may be formed or integrated in the semiconductor photonic substrate. Alternatively, the light source(s) 402 may external to the PIC but optically coupled to the input 404. The light source(s) 402 may be configured to emit electromagnetic radiation of different frequencies. This way, by using wavelength multiplexing of spatially parallel optical channels in a PIC/waveguide structures of PIC, the detrimental effects due to fluctuating targets and TOF limitations are mitigated, thus enabling a coherent LIDAR with high optical resolution, high data rate, and long-range detection to be achieved. The at least one light source 402 may be configured to provide coherent electromagnetic radiation to the plurality of waveguide structures, e.g. laser radiation in a visible light spectrum, an infrared spectrum, a terahertz spectrum and/or a microwave spectrum. The light source 402 may be configured to be operated as a continuous wave (CW) laser, e.g. for frequency modulated continuous wave (FMCW) LIDAR in in which the frequency of the light input to the input 404 is swept or chirped, and/or a pulsed laser, e.g. for TOF LIDAR. However, the light source 402 may also be a CW laser, e.g. a CW laser diode, operated in a pulsed mode, e.g. quasi CW (QCW) laser. Electromagnetic radiation, e.g. visible light, infrared radiation, terahertz radiation or microwave radiation, may be emitted to different parts of a target 210, e.g. at the same time, by the grating structure 304, as described in more detail below. This way, light emitted by the output 410 of the PIC samples different portions of a target (not the same pixel) and/or different targets at the same time. Thus, light reflected 144, 154, 164 from the target 210 and detected by the detecting structure 120 contains information correlated to different portions of a target (not the same pixel) and/or different targets at the same time. In other words, light form plurality of optical paths 140, 150, 160 is emitted into different directions in space by the grating structure 304. Light 144, 164 adjacent to the center path is back reflected from the target 210 and received from the target 210 in different optical paths from which it has been emitted before. However, since the emitting structures 110-1, 110-3 are arranged or controlled pairwise, a mapping between the emitted light and the information of the target 210 is enabled. As example, a sampling rate of the light detection and ranging system and, thus, a resolution, may be increased while at least maintaining or decreasing noise effects.

In various aspects, the optical system 100, e.g. a light detection and ranging system, may include a grating structure 304 optically configured to guide light from the output 410 of the plurality of waveguide structures/of the PIC to the outside 130 and from the outside 130 to the detecting structure 120. By using a multiple (M) wavelength laser source 402 and a diffraction grating as grating structure 304, the number of LIDAR channels may be increased by a factor of M for a given PIC to achieve a desired high number (>100) of vertical resolution elements or pixels. Hence, a high-performance coherent LIDAR system is achieved.

FIG. 5 illustrates a schematic diagram of a light detection and ranging system according to various aspects, e.g. as described above, during operation. In various aspects, at least one light source may be configured to emit electromagnetic radiation 140, 150, 160 of at least a first wavelength band a (also denoted as first wavelength) and to emit electromagnetic radiation 140, 150, 160 of at least a second wavelength band b (also denoted as second wavelength). The first wavelength band a may be different from the second wavelength band b. As example, the first wavelength band a and the second wavelength band b may not be overlapping.

In various aspects, the at least one light source may include at least a first laser diode configured to emit electromagnetic radiation of a first wavelength band a and a second laser diode configured to emit electromagnetic radiation of a second wavelength band b. Alternatively or in addition, the at least one light source may be a single light diode, e.g. a laser diode having a tunable spectrum and/or emit light in different wavelength bands, e.g. to emit electromagnetic radiation of the first and second wavelength band a, b.

The light detection and ranging system 200 may further include a converging lens 302 arranged in the optical path between the grating structure 304 and the emitting structure 110, e.g. the PIC described in FIG. 4. The converging lens 302 may be configured to guide light of the plurality of optical paths 410 of the photonic integrated circuit 110 into different directions ($\theta_1$, $\theta_2$, $\theta_N$) outside of the light detection and ranging system by the grating structure 304. In other words, the converging lens 302 may be configured and/or may be provided such that light from the outputs 410 and/or the emitting structures 110 have different angles of inclination on a (planar) grating structure 304. However, the function of the converging lens 302 and of the grating structure 304 may also be integrated in a single optical element in various aspects. The purpose of both elements 302, 304 may be to emit parallel light from the outputs of the optical paths into different directions in space at the same time and receive and detect the light 144, 154, 164 back reflected from a target 210. The grating structure 304 may be configured to guide or redirect electromagnetic radiation of a first wavelength a by a first angle ($\theta^a_{1, 2, \ldots, N}$ in FIG. 5) and a second wavelength b by a second angle ($\theta^b_{1, 2, \ldots, N}$ in FIG. 5). Thus, emitted light or received light of the optical paths may be emitted and received from different directions in space (in FIG. 5 denoted by $\theta^a_1$, $\theta^a_2$, $\theta^a_N$, $\theta b_1$, $\theta^b_2$, $\theta^b_N$) depending on the wavelength (frequency) of the light a/b. In FIG. 3 and FIG. 4, the light detection and ranging system is illustrated in a linear fashion with the lens 302 illustrated as converging lens 302 and the grating structure 304 as a transmission grating. However, the PIC or at least the outputs of the PIC, the lens 302 and the grating structure 304 may be arranged vertically over each other as layers in a stack. As example, the grating structure 304 may be configured as a reflection grating (as illustrated in FIG. 5).

In various aspects, light of the first wavelength a and light of the second wavelength b may be emitted at the same time, e.g. the optical paths may be multiplexed, or successively. As example, light of the second wavelength b maybe emitted in the time period while awaiting light of the first wavelength to be received at the photo detector.

In various aspects, using light (of the same wavelength) emitted by a plurality of optical paths into different directions in space $\theta_{1/2/N}$ and/or using light of different wavelength that is emitted into different directions in space $\theta^{a/b}$ may enable a scanning, sensing or sampling of different parts of a target or free space at the same time and, thus, allows to increase the resolution of a light detection and ranging system.

Figure 6:
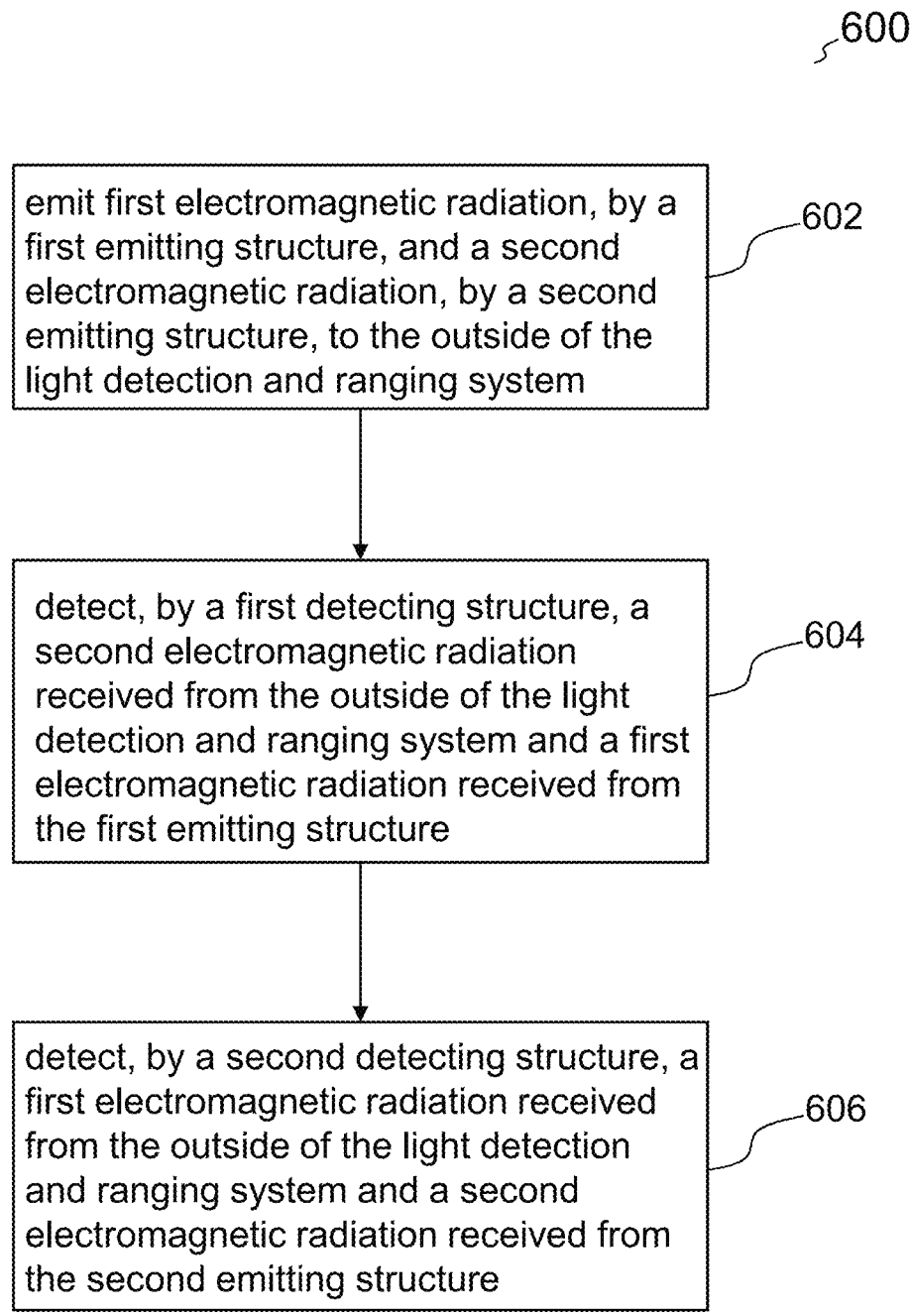
FIG. 6 illustrates a flow diagram of method of operating a light detection and ranging system according to various aspects.

FIG. 6 illustrates a flow diagram of a method 600 to operate a light detection and ranging system 200 according to various aspects. The method 600 may include: emit 602 first electromagnetic radiation, by a first emitting structure, and a second electromagnetic radiation, by a second emitting structure, to the outside of the light detection and ranging system. The method 600 may further include detect 604, by a first detecting structure, a second electromagnetic radiation received from the outside of the light detection and ranging system and a first electromagnetic radiation received from the first emitting structure. The method 600 may further include detect 606, by a second detecting structure, a first electromagnetic radiation received from the outside of the light detection and ranging system and a second electromagnetic radiation received from the second emitting structure.

The method 600 may include to determine a frequency difference between the frequency of the electromagnetic radiations received by the first emitting structure and determine a frequency difference between the electromagnetic radiations received by second detecting structure.

The method 600 may include to determine a time difference between the emission and detection timing of the electromagnetic radiation received by the first detecting structure and a time difference between the emission and detection timing of the electromagnetic radiation received by the second.

The method 600 may include to emit the coherent first electromagnetic radiation and the coherent second electromagnetic radiation at the same time.

The coherent first electromagnetic radiation and the coherent second electromagnetic radiation have the same frequency.

The coherent first electromagnetic radiation may have a first frequency and the coherent second electromagnetic radiation may have a second frequency different from the first frequency.

In various aspects, the method 600 to operate a light detection and ranging system, may include emit, by a first electromagnetic radiation emitting structure 110-1, a coherent first electromagnetic radiation and emit, by a second electromagnetic radiation emitting structure 110-3, a coherent second electromagnetic radiation; detect, by a first electromagnetic radiation detecting structure 120-1, the first and second coherent electromagnetic radiation, and detect, by a second electromagnetic radiation detecting structure 120-3, the first and second coherent electromagnetic radiation; guide, by a plurality of optical components 170, electromagnetic radiation from the at least first and second electromagnetic radiation emitting structures to an outside 130 of the optical system 100 and from the outside 130 of the optical system 100 to the least first and second electromagnetic radiation detecting structures, wherein the plurality of optical components 170 may be configured to guide first electromagnetic radiation from the coherent first electromagnetic radiation emitting structure 110-1 to the coherent first electromagnetic radiation detecting structure 120-1 and first electromagnetic radiation from the outside 130 of the optical system 100 to the coherent second electromagnetic radiation detecting structure 120-3 and to guide second electromagnetic radiation from the coherent second electromagnetic radiation emitting structure 110-3 to the coherent second electromagnetic radiation detecting structure 120-3 and second electromagnetic radiation from the outside 130 of the optical system 100 to the coherent first electromagnetic radiation detecting structure 120-1, wherein the plurality of optical components 170 may be configured that the first and second electromagnetic radiations may be coherent to each other at the first and second electromagnetic radiation detecting structure 120-3, wherein the plurality of optical components 170 may include an optical axis, wherein the coherent first electromagnetic radiation emitting structure 110-1 may be arranged in a first distance 170 from the optical axis and the coherent second electromagnetic radiation emitting structure 110-3 may be arranged in a second distance 172 from the optical axis, wherein the first distance 170 may be the same as the second distance 172; and wherein the at least a first electromagnetic radiation emitting structure 110-1 and the coherent second electromagnetic radiation emitting structure 110-3 may be formed by a photonic integrated circuit.

For one or more aspects, at least one of the components set forth in one or more of the preceding FIGS. may be configured to perform one or more operations, techniques, processes, and/or methods as set forth in the example section below. For example, the baseband circuitry as described above in connection with one or more of the preceding FIGS. may be configured to operate in accordance with one or more of the examples set forth below. For another example, circuitry associated with a UE, base station, network element, etc. as described above in connection with one or more of the preceding FIGS. may be configured to operate in accordance with one or more of the examples set forth below in the example section.

EXAMPLES

The examples set forth herein are illustrative and not exhaustive.

Example 1 is a light detection and ranging system, including at least a first electromagnetic radiation emitting structure configured to emit a coherent first electromagnetic radiation and a second electromagnetic radiation emitting structure configured to emit a coherent second electromagnetic radiation; at least a first electromagnetic radiation detecting structure configured to detect the first and second coherent electromagnetic radiation and a second electromagnetic radiation detecting structure configured to detect the first and second coherent electromagnetic radiation; a plurality of optical components optically configured to guide electromagnetic radiation from the at least first and second electromagnetic radiation emitting structures to an outside of the light detection and ranging system and from the outside of the light detection and ranging system to the least first and second electromagnetic radiation detecting structures, wherein the plurality of optical components is configured to guide first electromagnetic radiation from the coherent first electromagnetic radiation emitting structure to the coherent first electromagnetic radiation detecting structure, to guide first electromagnetic radiation from the outside of the light detection and ranging system to the coherent second electromagnetic radiation detecting structure and to guide second electromagnetic radiation from the coherent second electromagnetic radiation emitting structure to the coherent second electromagnetic radiation detecting structure and second electromagnetic radiation from the outside of the light detection and ranging system to the coherent first electromagnetic radiation detecting structure, wherein the plurality of optical components is configured so that the first and second electromagnetic radiations are coherent to each other at the first and second electromagnetic radiation detecting structures, wherein the plurality of optical components includes an optical axis, wherein the coherent first electromagnetic radiation emitting structure is arranged in a first distance from the optical axis and the coherent second electromagnetic radiation emitting structure is arranged in a second distance from the optical axis, wherein the first distance is the same as the second distance; and wherein the at least a first electromagnetic radiation emitting structure and the coherent second electromagnetic radiation emitting structure are formed by a photonic integrated circuit.

In Example 2, the subject matter of Example 1 can optionally further include that the coherent first electromagnetic radiation emitting structure, the optical axis and the coherent second electromagnetic radiation emitting structure are arranged along or in one common line.

In Example 3, the subject matter of any one of Example 1 or Example 2 can optionally further include a third electromagnetic radiation emitting structure arranged in a third distance from the coherent first electromagnetic radiation emitting structure and a fourth electromagnetic radiation emitting structure arranged in a fourth distance from the coherent second electromagnetic radiation emitting structure, wherein the third distance is the same as the fourth distance and wherein the third distance is different from the first distance.

In Example 4, the subject matter of any one of any one of Example 1 to 3 can optionally further include a center electromagnetic radiation emitting structure arranged at the optical axis of the plurality of optical components.

In Example 5, the subject matter of any one of any one of Example 1 to 4 can optionally further include that the plurality of optical components includes a movable mirror configured to direct the first and second electromagnetic radiations to the outside and to direct reflected first and second electromagnetic radiation from the outside to the first and second electromagnetic radiation detecting structures.

In Example 6, the subject matter of any one of any one of Example 1 to 5 can optionally further include that the plurality of optical components includes a grating structure configured to direct the first and second electromagnetic radiations to the outside and to direct reflected first and second electromagnetic radiation from the outside to the first and second electromagnetic radiation detecting structures.

In Example 7, the subject matter of any one of Example 6 can optionally further include that the plurality of optical components includes a converging lens configured to collimate and align the first and second electromagnetic radiation onto the grating structure.

In Example 8, the subject matter of any one of any one of Example 1 to 7 can optionally further include that the plurality of optical components includes a phase shifting structure configured to shift a phase of the first and second electromagnetic radiation In Example 9, the subject matter of any one of any one of Example 1 to 8 can optionally further include that the plurality of optical components includes an optical tap configured to direct the coherent first electromagnetic radiation to the coherent second electromagnetic radiation detecting structure and to direct second electromagnetic radiation to the coherent first electromagnetic radiation detecting structure, wherein the optical tap is configured as a substantially transparent plate.

In Example 10, the subject matter of any one of any one of Example 1 to 9 can optionally further include a two-dimensional array comprising a plurality of electromagnetic radiation emitting structures, the plurality of electromagnetic radiation emitting structures including the first and second electromagnetic radiation emitting structures.

In Example 11, the subject matter of any one of any one of Example 1 to 10 can optionally further include that the plurality of optical components includes a movable mirror and a grating structure configured to direct the first and second electromagnetic radiations to the outside and to direct reflected first and second electromagnetic radiation from the outside to the first and second electromagnetic radiation detecting structures.

In Example 12, the subject matter of any one of any one of Example 1 to 11 can optionally further include a controller configured to control at least the first and second electromagnetic radiation emitting structures to adjust the emission timing of the emission of the first and second electromagnetic radiation.

In Example 13, the subject matter of any one of Example 12 can optionally further include a controller configured to control at least the first and second electromagnetic radiation detecting structures to detect the first and second electromagnetic radiation.

In Example 14, the subject matter of any one of Example 12 or 13 can optionally further include that the controller is further configured to determine a difference between the frequency and/or phase of the first and second electromagnetic radiation received by the coherent first electromagnetic radiation detecting structure; and to determine a difference between the frequency and/or phase of the first and second electromagnetic radiation received by the coherent second electromagnetic radiation detecting structure.

In Example 15, the subject matter of any one of any one of Example 12 to 14 can optionally further include that the controller is further configured to determine a time difference between the emission timing of the coherent first electromagnetic radiation received by the coherent first electromagnetic radiation emitting structure and the receiving timing of the coherent second electromagnetic radiation received by the coherent first electromagnetic radiation emitting structure detecting structure; and to determine a time difference between the emission timing of the coherent second electromagnetic radiation received by the coherent second electromagnetic radiation emitting structure and the receiving timing of the coherent first electromagnetic radiation received by the coherent second electromagnetic radiation emitting structure detecting structure.

In Example 16, the subject matter of any one of any one of Example 12 to 15 can optionally further include that the controller is further configured to emit the coherent first electromagnetic radiation and the coherent second electromagnetic radiation at the same time.

In Example 17, the subject matter of any one of any one of Example 1 to 16 can optionally further include that the coherent first electromagnetic radiation and the coherent second electromagnetic radiation have the same frequency.

In Example 18, the subject matter of any one of Example 17 can optionally further include that the coherent first electromagnetic radiation has a first frequency and the coherent second electromagnetic radiation has a second frequency different from the first frequency.

In Example 19, the subject matter of any one of any one of Example 1 to 18 can optionally further include that a balanced detector having at least a first balanced detector and a second balanced detector, wherein each of the first and second balanced detectors includes the first and second electromagnetic radiation detecting structures.

In Example 20, the subject matter of any one of any one of Example 1 to 19 can optionally further include that the first and second electromagnetic radiation emitting structures are configured to emit electromagnetic radiation of at least at first frequency band and of a second frequency band not overlapping the first frequency band.

Example 21 is an optical system, including at least a first electromagnetic radiation emitting structure configured to emit a coherent first electromagnetic radiation and a second electromagnetic radiation emitting structure configured to emit a coherent second electromagnetic radiation; at least a first electromagnetic radiation detecting structure configured to detect the first and second coherent electromagnetic radiation and a second electromagnetic radiation detecting structure configured to detect the first and second coherent electromagnetic radiation; a plurality of optical components optically configured to guide electromagnetic radiation from the at least first and second electromagnetic radiation emitting structures to an outside of the optical system and from the outside of the optical system to the least first and second electromagnetic radiation detecting structures, wherein the plurality of optical components is configured to guide first electromagnetic radiation from the coherent first electromagnetic radiation emitting structure to the coherent first electromagnetic radiation detecting structure, to guide first electromagnetic radiation from the outside of the optical system to the coherent second electromagnetic radiation detecting structure and to guide second electromagnetic radiation from the coherent second electromagnetic radiation emitting structure to the coherent second electromagnetic radiation detecting structure and second electromagnetic radiation from the outside of the optical system to the coherent first electromagnetic radiation detecting structure, and wherein the plurality of optical components is configured so that the first and second electromagnetic radiations are coherent to each other at the first and second electromagnetic radiation detecting structures.

In Example 22, the subject matter of Example 21 can optionally further include that the plurality of optical components includes an optical axis, wherein the coherent first electromagnetic radiation emitting structure is arranged in a first distance from the optical axis and the coherent second electromagnetic radiation emitting structure is arranged in a second distance from the optical axis, wherein the first distance is the same as the second distance.

In Example 23, the subject matter of any one of Example 21 or 22 can optionally further include that the coherent first electromagnetic radiation emitting structure, the optical axis and the coherent second electromagnetic radiation emitting structure are arranged along or in one common line.

In Example 24, the subject matter of any one of any one of Example 21 to 23 can optionally further include a third electromagnetic radiation emitting structure arranged in a third distance from the coherent first electromagnetic radiation emitting structure and a fourth electromagnetic radiation emitting structure arranged in a fourth distance from the coherent second electromagnetic radiation emitting structure, wherein the third distance is the same as the fourth distance and wherein the third distance is different from the first distance.

In Example 25, the subject matter of any one of any one of Example 21 to 24 can optionally further include a center electromagnetic radiation emitting structure arranged at an optical axis of the plurality of optical components.

In Example 26, the subject matter of any one of any one of Example 21 to 25 can optionally further include that the at least a first electromagnetic radiation emitting structure and the coherent second electromagnetic radiation emitting structure are formed by a photonic integrated circuit.

In Example 27, the subject matter of any one of any one of Example 21 to 26 can optionally further include that the plurality of optical components includes a movable mirror and a grating structure configured to direct the first and second electromagnetic radiations to the outside and to direct reflected first and second electromagnetic radiation from the outside to the first and second electromagnetic radiation detecting structures.

In Example 28, the subject matter of any one of any one of Example 21 to 27 can optionally further include that the plurality of optical components includes a grating structure configured to direct the first and second electromagnetic radiations to the outside and to direct reflected first and second electromagnetic radiation from the outside to the first and second electromagnetic radiation detecting structures.

In Example 29, the subject matter of Example 28 can optionally further include that the plurality of optical components includes a converging lens configured to collimate and align the first and second electromagnetic radiation onto the grating structure.

In Example 30, the subject matter of any one of any one of Example 21 to 29 can optionally further include that the plurality of optical components includes a phase shifting structure configured to shift a phase of the first and second electromagnetic radiation In Example 31, the subject matter of any one of any one of Example 21 to 30 can optionally further include that the plurality of optical components includes an optical tap configured to direct the coherent first electromagnetic radiation to the coherent second electromagnetic radiation detecting structure and to direct second electromagnetic radiation to the coherent first electromagnetic radiation detecting structure, wherein the optical tap is configured as a substantially transparent plate.

In Example 32, the subject matter of any one of any one of Example 21 to 31 can optionally further include a two-dimensional array comprising a plurality of electromagnetic radiation emitting structures, the plurality of electromagnetic radiation emitting structures including the first and second electromagnetic radiation emitting structures.

In Example 33, the subject matter of any one of any one of Example 21 to 32 can optionally further include that the plurality of optical components includes a movable mirror configured to direct the first and second electromagnetic radiations to the outside and to direct reflected first and second electromagnetic radiation from the outside to the first and second electromagnetic radiation detecting structures.

In Example 34, the subject matter of any one of any one of Example 21 to 33 can optionally further include a controller configured to control at least the first and second electromagnetic radiation emitting structures to adjust the emission timing of the emission of the first and second electromagnetic radiation.

In Example 35, the subject matter of any one of any one of Example 34 can optionally further include a/the controller configured to control at least the first and second electromagnetic radiation detecting structures to detect the first and second electromagnetic radiation.

In Example 36, the subject matter of any one of any one of Example 34 or 35 can optionally further include that the controller is further configured to determine a difference between the frequency and/or phase of the first and second electromagnetic radiation received by the coherent first electromagnetic radiation detecting structure; and to determine a difference between the frequency and/or phase of the first and second electromagnetic radiation received by the coherent second electromagnetic radiation detecting structure.

In Example 37, the subject matter of any one of any one of Example 34 to 36 can optionally further include that the controller is further configured to determine a time difference between the emission timing of the coherent first electromagnetic radiation received by the coherent first electromagnetic radiation emitting structure and the receiving timing of the coherent second electromagnetic radiation received by the coherent first electromagnetic radiation emitting structure detecting structure; and to determine a time difference between the emission timing of the coherent second electromagnetic radiation received by the coherent second electromagnetic radiation emitting structure and the receiving timing of the coherent first electromagnetic radiation received by the coherent second electromagnetic radiation emitting structure detecting structure.

In Example 38, the subject matter of any one of any one of Example 34 to 37 can optionally further include that the controller further configured to emit the coherent first electromagnetic radiation and the coherent second electromagnetic radiation at the same time.

In Example 39, the subject matter of any one of any one of Example 21 to 38 can optionally further include that the coherent first electromagnetic radiation and the coherent second electromagnetic radiation have the same frequency.

In Example 40, the subject matter of any one of any one of Example 21 to 39 can optionally further include that the coherent first electromagnetic radiation has a first frequency and the coherent second electromagnetic radiation has a second frequency different from the first frequency.

In Example 41, the subject matter of any one of any one of Example 21 to 40 can optionally further include a balanced detector having at least a first balanced detector and a second balanced detector, wherein each of the first and second balanced detectors includes the first and second electromagnetic radiation detecting structures.

In Example 42, the subject matter of any one of any one of Example 21 to 41 can optionally further include that the first and second electromagnetic radiation emitting structures are configured to emit electromagnetic radiation of at least at first frequency band and of a second frequency band not overlapping the first frequency band.

In Example 43, the subject matter of any one of any one of Example 21 to 42 can optionally further include that the optical system is a light detection and ranging system.

Example 44 is a method to operate a light detection and ranging system, the method including: emit, by a first electromagnetic radiation emitting structure, a coherent first electromagnetic radiation and emit, by a second electromagnetic radiation emitting structure, a coherent second electromagnetic radiation; detect, by a first electromagnetic radiation detecting structure, the first and second coherent electromagnetic radiation, and detect, by a second electromagnetic radiation detecting structure, the first and second coherent electromagnetic radiation; guide, by a plurality of optical components, electromagnetic radiation from the at least first and second electromagnetic radiation emitting structures to an outside of the light detection and ranging system and from the outside of the light detection and ranging system to the least first and second electromagnetic radiation detecting structures, wherein the plurality of optical components is configured to guide first electromagnetic radiation from the coherent first electromagnetic radiation emitting structure to the coherent first electromagnetic radiation detecting structure, to guide first electromagnetic radiation from the outside of the light detection and ranging system to the coherent second electromagnetic radiation detecting structure and to guide second electromagnetic radiation from the coherent second electromagnetic radiation emitting structure to the coherent second electromagnetic radiation detecting structure and second electromagnetic radiation from the outside of the light detection and ranging system to the coherent first electromagnetic radiation detecting structure, wherein the plurality of optical components is configured so that the first and second electromagnetic radiations are coherent to each other at the first and second electromagnetic radiation detecting structures, wherein the plurality of optical components includes an optical axis, wherein the coherent first electromagnetic radiation emitting structure is arranged in a first distance from the optical axis and the coherent second electromagnetic radiation emitting structure is arranged in a second distance from the optical axis, wherein the first distance is the same as the second distance; and wherein the at least a first electromagnetic radiation emitting structure and the coherent second electromagnetic radiation emitting structure are formed by a photonic integrated circuit.

In Example 45, the subject matter of Example 44 can optionally further include that the coherent first electromagnetic radiation emitting structure, the optical axis and the coherent second electromagnetic radiation emitting structure are arranged along or in one common line.

In Example 46, the subject matter of any one of Example 44 or 45 can optionally further include a third electromagnetic radiation emitting structure arranged in a third distance from the coherent first electromagnetic radiation emitting structure and a fourth electromagnetic radiation emitting structure arranged in a fourth distance from the coherent second electromagnetic radiation emitting structure, wherein the third distance is the same as the fourth distance and wherein the third distance is different from the first distance.

In Example 47, the subject matter of any one of any one of Example 44 to 46 can optionally further include that a center electromagnetic radiation emitting structure arranged at the optical axis of the plurality of optical components.

In Example 48, the subject matter of any one of any one of Example 44 to 47 can optionally further include that the plurality of optical components includes a movable mirror configured to direct the first and second electromagnetic radiations to the outside and to direct reflected first and second electromagnetic radiation from the outside to the first and second electromagnetic radiation detecting structures.

In Example 49, the subject matter of any one of any one of Example 44 to 48 can optionally further include that the plurality of optical components includes a grating structure configured to direct the first and second electromagnetic radiations to the outside and to direct reflected first and second electromagnetic radiation from the outside to the first and second electromagnetic radiation detecting structures.

In Example 50, the subject matter of any one of any one of Example 44 to 49 can optionally further include that the plurality of optical components includes a converging lens configured to collimate and align the first and second electromagnetic radiation onto the grating structure.

In Example 51, the subject matter of any one of any one of Example 44 to 50 can optionally further include that the plurality of optical components includes a phase shifting structure configured to shift a phase of the first and second electromagnetic radiation In Example 52, the subject matter of any one of any one of Example 44 to 51 can optionally further include that the plurality of optical components includes an optical tap configured to direct the coherent first electromagnetic radiation to the coherent second electromagnetic radiation detecting structure and to direct second electromagnetic radiation to the coherent first electromagnetic radiation detecting structure, wherein the optical tap is configured as a substantially transparent plate.

In Example 53, the subject matter of any one of any one of Example 44 to 52 can optionally further include a two-dimensional array comprising a plurality of electromagnetic radiation emitting structures, the plurality of electromagnetic radiation emitting structures including the first and second electromagnetic radiation emitting structures.

In Example 54, the subject matter of any one of any one of Example 44 to 53 can optionally further include that the plurality of optical components includes a movable mirror and a grating structure configured to direct the first and second electromagnetic radiations to the outside and to direct reflected first and second electromagnetic radiation from the outside to the first and second electromagnetic radiation detecting structures.

In Example 55, the subject matter of any one of any one of Example 44 to 54 can optionally further include a controller configured to control at least the first and second electromagnetic radiation emitting structures to adjust the emission timing of the emission of the first and second electromagnetic radiation.

In Example 56, the subject matter of any one of any one of Example 44 to 55 can optionally further include a controller configured to control at least the first and second electromagnetic radiation detecting structures to detect the first and second electromagnetic radiation.

In Example 57, the subject matter of any one of any one of Example 55 or 56 can optionally further include that the controller is further configured to determine a difference between the frequency and/or phase of the first and second electromagnetic radiation received by the coherent first electromagnetic radiation detecting structure; and to determine a difference between the frequency and/or phase of the first and second electromagnetic radiation received by the coherent second electromagnetic radiation detecting structure.

In Example 58, the subject matter of any one of any one of Example 55 to 57 can optionally further include that the controller is further configured to determine a time difference between the emission timing of the coherent first electromagnetic radiation received by the coherent first electromagnetic radiation emitting structure and the receiving timing of the coherent second electromagnetic radiation received by the coherent first electromagnetic radiation emitting structure detecting structure; and determine a time difference between the emission timing of the coherent second electromagnetic radiation received by the coherent second electromagnetic radiation emitting structure and the receiving timing of the coherent first electromagnetic radiation received by the coherent second electromagnetic radiation emitting structure detecting structure.

In Example 59, the subject matter of any one of any one of Example 55 to 58 can optionally further include that the controller is further configured to emit the coherent first electromagnetic radiation and the coherent second electromagnetic radiation at the same time.

In Example 60, the subject matter of any one of any one of Example 44 to 59 can optionally further include that the coherent first electromagnetic radiation and the coherent second electromagnetic radiation have the same frequency.

In Example 61, the subject matter of any one of any one of Example 44 to 60 can optionally further include that the coherent first electromagnetic radiation has a first frequency and the coherent second electromagnetic radiation has a second frequency different from the first frequency.

In Example 62, the subject matter of any one of any one of Example 44 to 61 can optionally further include a balanced detector having at least a first balanced detector and a second balanced detector, wherein each of the first and second balanced detectors includes the first and second electromagnetic radiation detecting structures.

In Example 63, the subject matter of any one of any one of Example 44 to 62 can optionally further include that the first and second electromagnetic radiation emitting structures are configured to emit electromagnetic radiation of at least at first frequency band and of a second frequency band not overlapping the first frequency band.

Example 64 is a light detection and ranging system including at least one electromagnetic radiation emitting structure formed by a photonic integrated circuit configured to emit a coherent first electromagnetic radiation; at least one electromagnetic radiation detecting structure configured to receive the coherent first electromagnetic radiation and a second electromagnetic radiation that is coherent to the coherent first electromagnetic radiation, wherein the electromagnetic radiation detecting structure is external to the photonic integrated circuit; a plurality of optical components optically configured to guide the coherent first electromagnetic radiation from the electromagnetic radiation emitting structure to an outside of the light detection and ranging system and from the outside of the light detection and ranging system to the electromagnetic radiation detecting structure, wherein the plurality of optical components is further configured to provide the coherent second electromagnetic radiation.

In Example 65, the subject matter of Example 64 can optionally include that the optical components are optically configured to generate the coherent second electromagnetic radiation from the coherent first electromagnetic radiation before the coherent first electromagnetic radiation is emitted to the outside.

In Example 66, the subject matter of Example 64 can optionally include that the photonic integrated circuit includes a second electromagnetic radiation emitting structure configured to emit the coherent second electromagnetic radiation.

In Example 67, the subject matter of any one of Examples 64 to 66 can optionally include that the plurality of optical components includes a movable mirror and a grating structure configured to direct the coherent first electromagnetic radiation to the outside and to direct reflected first electromagnetic radiation from the outside to the electromagnetic radiation detecting structure.

In Example 68, the subject matter of Example 67 can optionally include that the plurality of optical components includes a converging lens configured to collimate and align the coherent first electromagnetic radiation onto the grating structure.

In Example 69, the subject matter of any one of Examples 64 to 68 can optionally include that the plurality of optical components includes a half wave plate optically configured to generate the coherent second electromagnetic radiation.

In Example 70, the subject matter of any one of Examples 64 or 66 to 69 can optionally include that the photonic integrated circuit includes a two-dimensional array of electromagnetic radiation emitting structures, the plurality of electromagnetic radiation emitting structures including the coherent first electromagnetic radiation emitting structure.

In Example 71, the subject matter of any one of Examples 64 to 70 can optionally include that a controller configured to control at least the coherent first electromagnetic radiation emitting structure to adjust the emission timing of the emission of the coherent first electromagnetic radiation.

In Example 72, the subject matter of any one of Examples 64 to 71 can optionally include a controller configured to control at least the coherent first electromagnetic radiation detecting structure to detect the first and second electromagnetic radiations.

In Example 73, the subject matter of any one of Examples 71 or 72 can optionally include that the controller is further configured to determine a difference between the frequency and/or phase of the first and second electromagnetic radiation received by the coherent first electromagnetic radiation detecting structure.

In Example 74, the subject matter of any one of Examples 71 to 73 can optionally include that the controller is further configured to determine a frequency difference between the emission frequency of the coherent first electromagnetic radiation received by the electromagnetic radiation emitting structure and the receiving frequency of the coherent second electromagnetic radiation received by the electromagnetic radiation emitting structure detecting structure.

In Example 75, the subject matter of any one of Examples 64 to 74 can optionally include a balanced detector arrangement having at least a first detector and a second detector, wherein each of the first and second detectors includes the electromagnetic radiation detecting structure.

Any of the above-described examples may be combined with any other example (or combination of examples), unless explicitly stated otherwise. The foregoing description of one or more implementations provides illustration and description, but is not intended to be exhaustive or to limit the scope of aspects to the precise form disclosed. Modifications and variations are possible in light of the above teachings or may be acquired from practice of various aspects. Any of the above-described examples may be combined with any other example (or combination of examples), unless explicitly stated otherwise. The foregoing description of one or more implementations provides illustration and description, but is not intended to be exhaustive or to limit the scope of aspects to the precise form disclosed. Modifications and variations are possible in light of the above teachings or may be acquired from practice of various aspects.

While the invention has been particularly shown and described with reference to specific aspects, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A light detection and ranging system, comprising
at least a first electromagnetic radiation emitting structure configured to emit a coherent first electromagnetic radiation and a second electromagnetic radiation emitting structure configured to emit a coherent second electromagnetic radiation;
at least a first electromagnetic radiation detecting structure configured to detect the first and second coherent electromagnetic radiation and a second electromagnetic radiation detecting structure configured to detect the first and second coherent electromagnetic radiation;
a plurality of optical components optically configured to guide electromagnetic radiation from the at least first and second electromagnetic radiation emitting structures to an outside of the light detection and ranging system and from the outside of the light detection and ranging system to the least first and second electromagnetic radiation detecting structures,
wherein the plurality of optical components is configured to:
guide first electromagnetic radiation from the coherent first electromagnetic radiation emitting structure to the coherent first electromagnetic radiation detecting structure, guide first electromagnetic radiation from the outside of the light detection and ranging system to the coherent second electromagnetic radiation detecting structure, guide second electromagnetic radiation from the coherent second electromagnetic radiation emitting structure to the coherent second electromagnetic radiation detecting structure, and guide second electromagnetic radiation from the outside of the light detection and ranging system to the coherent first electromagnetic radiation detecting structure, wherein the plurality of optical components is configured so that the first and second electromagnetic radiations are coherent to each other at the first and second electromagnetic radiation detecting structures;

wherein the plurality of optical components comprises an optical axis, wherein the coherent first electromagnetic radiation emitting structure is arranged in a first distance from the optical axis and the coherent second electromagnetic radiation emitting structure is arranged in a second distance from the optical axis, wherein the first distance is the same as the second distance; and wherein the at least a first electromagnetic radiation emitting structure and the coherent second electromagnetic radiation emitting structure are formed by a photonic integrated circuit.

2. The light detection and ranging system according to claim 1,
wherein the coherent first electromagnetic radiation emitting structure, the optical axis and the coherent second electromagnetic radiation emitting structure are arranged along or in one common line.

3. The light detection and ranging system according to claim 1, further comprising
a third electromagnetic radiation emitting structure arranged in a third distance from the coherent first electromagnetic radiation emitting structure and a fourth electromagnetic radiation emitting structure arranged in a fourth distance from the coherent second electromagnetic radiation emitting structure, wherein the third distance is the same as the fourth distance and wherein the third distance is different from the first distance.

4. The light detection and ranging system according to claim 1, further comprising
a center electromagnetic radiation emitting structure arranged at the optical axis of the plurality of optical components.

5. The light detection and ranging system according to claim 1,
wherein the plurality of optical components comprises a phase shifting structure configured to shift a phase of the first and second electromagnetic radiation.

6. The light detection and ranging system according to claim 1,
wherein the plurality of optical components comprises an optical tap configured to direct the coherent first electromagnetic radiation to the coherent second electromagnetic radiation detecting structure and to direct second electromagnetic radiation to the coherent first electromagnetic radiation detecting structure, wherein the optical tap is configured as a substantially transparent plate.

7. The light detection and ranging system according to claim 1, further comprising:
a two-dimensional array comprising a plurality of electromagnetic radiation emitting structures, the plurality of electromagnetic radiation emitting structures including the first and second electromagnetic radiation emitting structures.

8. The light detection and ranging system according to claim 1,
wherein the plurality of optical components comprises a movable mirror and a grating structure configured to direct the first and second electromagnetic radiations to the outside and to direct reflected first and second electromagnetic radiation from the outside to the first and second electromagnetic radiation detecting structures.

9. The light detection and ranging system according to claim 8,
wherein the plurality of optical components comprises a converging lens configured to collimate and align the first and second electromagnetic radiation onto the grating structure.

10. The light detection and ranging system according to claim 1, further comprising
a controller configured to control at least the first and second electromagnetic radiation emitting structures to adjust an emission timing of an emission of the first and second electromagnetic radiation.

11. The light detection and ranging system according to claim 10, further comprising
a controller configured to control at least the first and second electromagnetic radiation detecting structures to detect the first and second electromagnetic radiation.

12. The light detection and ranging system according to claim 10,
the controller further configured to:
determine a difference between a frequency and/or phase of the first and second electromagnetic radiation received by the coherent first electromagnetic radiation detecting structure; and
determine a difference between the frequency and/or phase of the first and second electromagnetic radiation received by the coherent second electromagnetic radiation detecting structure.

13. The light detection and ranging system according to claim 10,
the controller further configured to:
determine a time difference between the emission timing of the coherent first electromagnetic radiation received by the coherent first electromagnetic radiation emitting structure and the receiving timing of the coherent second electromagnetic radiation received by the coherent first electromagnetic radiation emitting structure detecting structure; and
determine a time difference between the emission timing of the coherent second electromagnetic radiation received by the coherent second electromagnetic radiation emitting structure and the receiving timing of the coherent first electromagnetic radiation received by the coherent second electromagnetic radiation emitting structure detecting structure.

14. The light detection and ranging system according to claim 10,
the controller further configured to emit the coherent first electromagnetic radiation and the coherent second electromagnetic radiation at the same time.

15. The light detection and ranging system according to claim 14,
   wherein the coherent first electromagnetic radiation and the coherent second electromagnetic radiation have the same frequency.

16. The light detection and ranging system according to claim 1, further comprising
   a balanced detector having at least a first balanced detector and a second balanced detector, wherein each of the first and second balanced detectors comprises the first and second electromagnetic radiation detecting structures.

17. An optical system, comprising
   at least a first electromagnetic radiation emitting structure configured to emit a coherent first electromagnetic radiation and a second electromagnetic radiation emitting structure configured to emit a coherent second electromagnetic radiation;
   at least a first electromagnetic radiation detecting structure configured to detect the first and second coherent electromagnetic radiation and a second electromagnetic radiation detecting structure configured to detect the first and second coherent electromagnetic radiation;
   a plurality of optical components optically configured to guide electromagnetic radiation from the at least first and second electromagnetic radiation emitting structures to an outside of the optical system and from the outside of the optical system to the least first and second electromagnetic radiation detecting structures,
   wherein the plurality of optical components is configured to:
   guide first electromagnetic radiation from the coherent first electromagnetic radiation emitting structure to the coherent first electromagnetic radiation detecting structure,
   guide first electromagnetic radiation from the outside of the optical system to the coherent second electromagnetic radiation detecting structure and
   guide second electromagnetic radiation from the coherent second electromagnetic radiation emitting structure to the coherent second electromagnetic radiation detecting structure and second electromagnetic radiation from the outside of the optical system to the coherent first electromagnetic radiation detecting structure, and
   wherein the plurality of optical components is configured so that the first and second electromagnetic radiations are coherent to each other at the first and second electromagnetic radiation detecting structures.

18. A light detection and ranging system, comprising
   at least one electromagnetic radiation emitting structure formed by a photonic integrated circuit configured to emit a coherent first electromagnetic radiation;
   at least one electromagnetic radiation detecting structure configured to receive the coherent first electromagnetic radiation and a second electromagnetic radiation that is coherent to the coherent first electromagnetic radiation, wherein the electromagnetic radiation detecting structure is external to the photonic integrated circuit;
   a plurality of optical components optically configured to guide the coherent first electromagnetic radiation from the electromagnetic radiation emitting structure to an outside of the light detection and ranging system and from the outside of the light detection and ranging system to the electromagnetic radiation detecting structure,
   wherein the plurality of optical components is further configured to provide the coherent second electromagnetic radiation.

19. The light detection and ranging system according to claim 18,
   wherein the optical components are optically configured to generate the coherent second electromagnetic radiation from the coherent first electromagnetic radiation before the coherent first electromagnetic radiation is emitted to the outside.

20. The light detection and ranging system according to claim 18,
   wherein the photonic integrated circuit comprises a second electromagnetic radiation emitting structure configured to emit the coherent second electromagnetic radiation.

* * * * *